US006552727B2

(12) United States Patent
Stamm

(10) Patent No.: US 6,552,727 B2
(45) Date of Patent: Apr. 22, 2003

(54) METHOD FOR AUTHORING HINTS FOR A FONT USING A GRAPHICAL USER INTERFACE

(75) Inventor: Beat Stamm, Kirkland, WA (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 09/961,418

(22) Filed: Sep. 25, 2001

(65) Prior Publication Data

US 2002/0033824 A1 Mar. 21, 2002

Related U.S. Application Data

(63) Continuation of application No. 09/049,633, filed on Mar. 27, 1998, now abandoned.

(51) Int. Cl.[7] .............................................. G06T 11/00
(52) U.S. Cl. ...................................... 345/467; 345/471
(58) Field of Search ................................. 345/467, 468, 345/469, 469.1, 470, 471, 472.3, 947, 948

(56) References Cited

U.S. PATENT DOCUMENTS

| 5,155,805 A | 10/1992 | Kaasila |
| 5,325,479 A | 6/1994 | Kaasila |
| 5,583,978 A | 12/1996 | Collins et al. |
| 5,586,241 A | 12/1996 | Bauermester et al. |
| 5,673,371 A | 9/1997 | Koopman et al. |
| 5,710,880 A | 1/1998 | Howlett et al. |
| 5,715,473 A | 2/1998 | Reed |
| 5,777,627 A | 7/1998 | Takazawa |
| 6,144,765 A | * 11/2000 | Tamura et al. ............... 345/467 |

OTHER PUBLICATIONS

*FontLab Powr typography*, Copyright 1997 FontLab Developer's Group, pp. 110–111, 135–137, 361, 143–145, 185–188, 197–198, 225–240, and 255–328.
*Macromedia Fontographer user's Manual*, Version 4.1. 3rd Ed., Copyright 1996 by Macromedia, Inc., pp. 123, 351, 296–314, 332, and 357–359.
*Microsoft True Type Editor (TTED)—Ted User Guide, Ted Talk Language Guide*, Revision 1.0, Copyright 1996 Microsoft Corporation, pp. 1–74.
IBM Technical Disclosure Bulletin article titled "User Interface 2–level Selectable Error Message Display during Drag/Drop," vol. 37, No. 8, Aug. 1994.

* cited by examiner

*Primary Examiner*—Mano Padmanabhan
(74) *Attorney, Agent, or Firm*—Banner & Witcoff, Ltd.

(57) ABSTRACT

Authoring hints for a font using a graphical user interface. Graphical hints may be dragged and dropped on a displayed glyph using a graphical user interface. A graphical hint is specified by selecting a hinting tool and selecting one or more points that define the glyph outline, such as a control point. A graphical hint is represented by a graphical element displayed on the glyph. The graphical hint can be automatically compiled and included in a font table. The compiled graphical hint is used to display the hinted glyph.

57 Claims, 17 Drawing Sheets

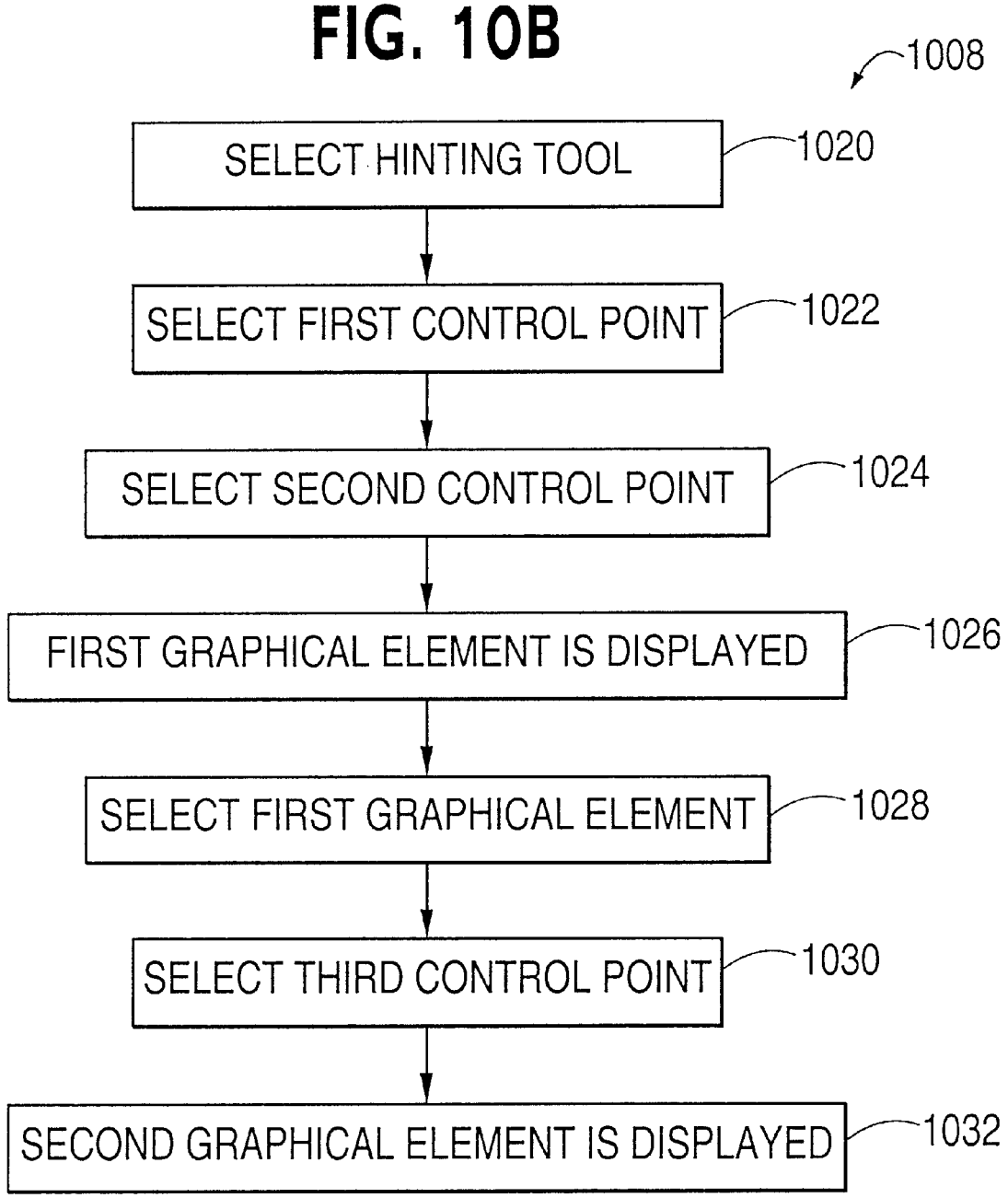

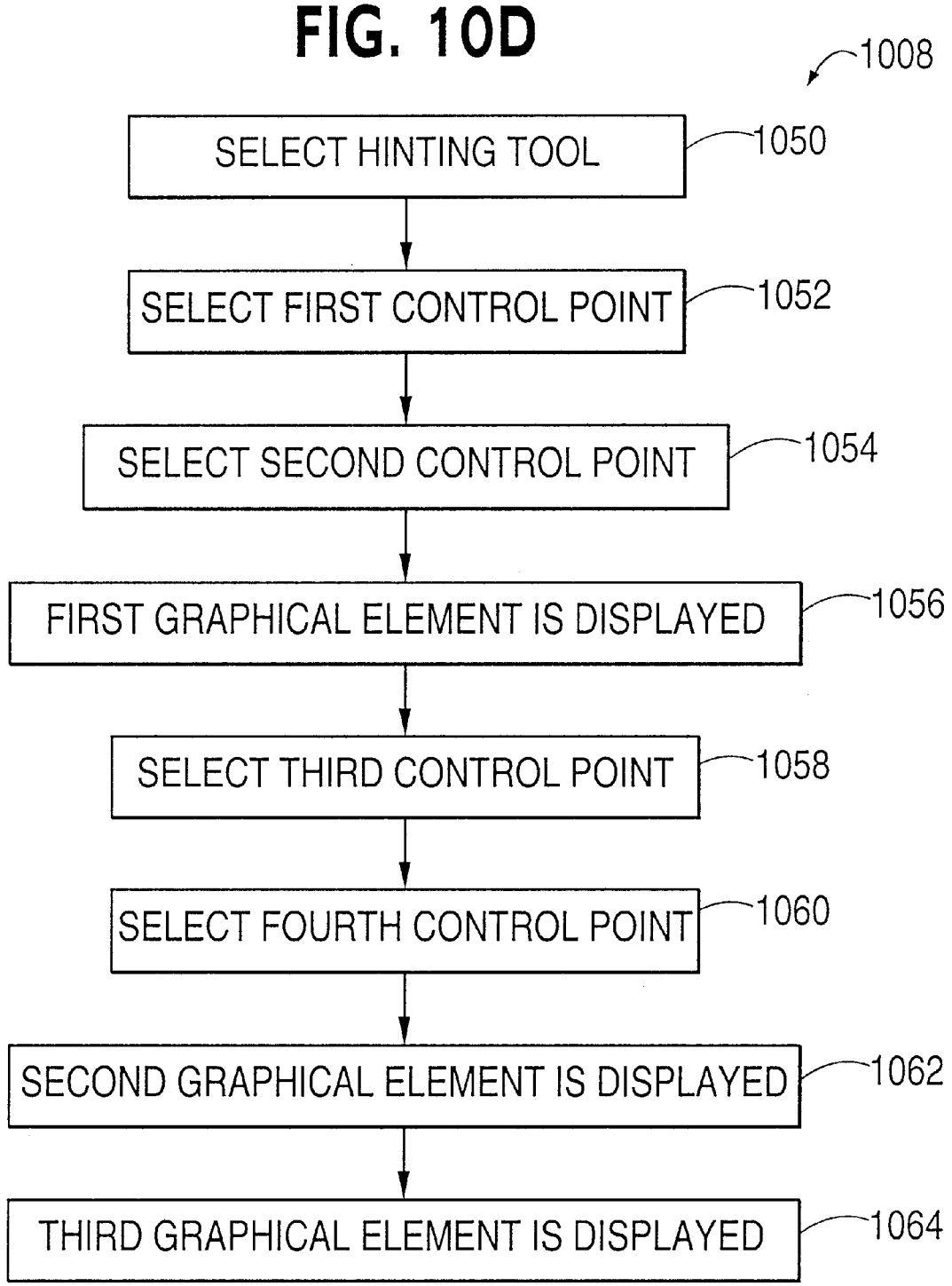

METHOD FOR AUTHORING HINTS FOR A FONT USING A GRAPHICAL USER INTERFACE

CROSS REFERENCE TO RELATED APPLICATIONS

This application is a continuation of prior application Ser. No. 09/049,633, filed Mar. 27, 1998 now abandoned, which is incorporated herein by reference herein.

FIELD OF THE INVENTION

This invention relates in general to authoring hints for a font, and in particular to authoring hints for a font using a graphical user interface.

BACKGROUND OF THE INVENTION

A font is a particular style of typeface such as Arial, Times New Roman or Courier. Fonts which conform to the TrueType Open font standard promulgated by Microsoft Corporation, assignee of the present invention, are commonly referred to as TrueType fonts. TrueType fonts contain font tables that include data, such as glyph outlines, metrics, bitmaps, and mapping information. A glyph outline is a set of mathematical data that describes the shape of the glyph. A glyph is a representation of one or more characters. A single glyph may represent a single character such as the lowercase letter "f" or a single glyph may represent a string of characters such as the ligature "fi".

To display or print a glyph, the glyph outline is first scaled to the selected font size and the resolution of the output device. The scaled glyph outline is then digitized or scan-converted to create a bitmap. Finally, the bitmap is rendered on an output device, such as a monitor or a printer, using a regularly spaced grid of picture elements ("pixels"). Scaling the glyph outline may not produce satisfactory results at all point sizes. At small point sizes, a low-resolution device may not have enough pixels to fill in the outline accurately. To compensate for the lack of pixels, hints or font instructions are added to the font to improve the appearance of the glyph. Hints typically control distances, proportions and pixel patterns.

For a TrueType font, a typographer may specify hints for the entire font or for individual glyphs using an assembly-type language. The typographer may use the low-level TrueType Instruction Set, or a high-level abstraction of the TrueType Instruction Set, such as Type Man Talk. Creating hints using one of the TrueType languages is often a tedious process. To begin creating hints for a glyph, the typographer typically prints a glyph outline for the glyph. The glyph outline includes control points which define the shape of the glyph. The typographer uses the glyph outline to visualize critical relationships between the control points, such as the distance in the x-direction between two control points or the distance in the y-direction between two control points. The typographer then draws these relationships on the glyph outline using colored pencils.

Once the typographer draws the relationships on the glyph outline, the typographer translates the colored pencil markings into font instructions. The translation requires that the typographer not only convert the relationships into the proper TrueType commands, but also requires that the typographer order the commands according to the command sequence requirements of the TrueType Instruction Set.

Once the typographer translates the relationships into font instructions, the font instructions are compiled and the compiled font instructions are used to display a bitmap for the glyph. The typographer reviews the bitmap to determine whether the appearance of the hinted glyph is satisfactory. If the appearance of the hinted glyph is not satisfactory, then the typographer must modify the font instructions or add additional font instructions. The typographer must repeat these steps until the appearance of the hinted glyph is satisfactory. If the typographer adds an additional font instruction, then the typographer must determine where to insert the font instruction. Because the TrueType Instruction Set requires certain command sequences, determining where to insert the additional font instruction is not usually obvious. If the additional font instruction is not inserted in the correct sequence, then the font instructions will not be correctly applied.

For the majority of typographers, it would be easier to hint a glyph if the relationships drawn on the glyph outline could be translated into font instructions without the typographer's intervention. In addition, it is easier to prevent or debug hinting errors, if the font instructions are shown on the glyph outline. For example, it is easier for the typographer to recognize a circular relationship if the circular relationship is shown graphically on the glyph outline, than if the circular relationship is only apparent from the font instructions.

One proposed solution to the hinting problem is provided by the Fontographer program marketed by Macromedia of San Francisco, Calif. The Fontographer program assists a typographer in designing a font by providing tools to support glyph outline design. The Fontographer program also provides some rudimentary hinting tools. The Fontographer program allows a typographer to specify horizontal and vertical serif hints, horizontal and vertical stem hints, and diagonal hints. For example, to specify a vertical stem hint, the typographer selects two points which define the vertical stem and then selects the "make vertical stem" command from the hints menu. The typographer may control the width of the vertical stem by specifying the x-coordinates of the stem. Typically, the x-coordinates of the stem are specified by editing the stem start and stem stop fields of a menu.

One drawback of the Fontographer program is that the hinting tools are limited. The TrueType instruction set includes many hinting instructions which are not supported by the Fontographer program. For example, the Fontographer program does not support interpolations or alignments.

Another drawback of the hinting tools provided by the Fontographer program is that hints must be specified in coordinates. For a TrueType font, it is more efficient to specify a hint using a control value. A control value is a value for a dominant width, length, or angle of a group of features, such as the stem width or serif length. Control values are stored in a font table commonly referred to as a control value table ("cvt"). Some control values are specific to certain glyphs, while other control values apply to the entire font. Requiring hints to refer to control values makes it easier to preserve regularity between the glyphs of the font.

Yet another drawback of the Fontographer program is that it displays hints outside the glyph outline. Displaying hints outside the glyph outline makes it difficult to identify the control points associated with a hint. Furthermore, Fontographer does not have a built-in rasterizer so a typographer cannot immediately see how a hint affects the appearance of a rendered glyph. The lack of a built-in rasterizer makes it difficult to fine-tune pixel patterns and stroke weights.

Accordingly, there is a need in the art for a method for authoring hints for a glyph using a graphical user interface.

There is also a need in the art for a graphical method for authoring hints using control point values.

SUMMARY OF THE INVENTION

The present invention meets the needs described above by permitting a typographer to drag and drop graphical hints on a displayed glyph using a graphical user interface. The graphical user interface provides the typographer with a number of hinting tools which correspond to hinting functions. The typographer specifies a graphical hint by selecting a hinting tool and selecting one or more points that define the glyph outline, such as a control point. The graphical hints are represented by graphical elements displayed on the glyph. The shape and color of the graphical elements indicate the type of hinting function. Options for the graphical hints are represented by graphical components.

The graphical hints are compiled and placed in the font tables without requiring that the typographer manually code the hints. Once the graphical hints for a glyph are compiled, the hinted glyph is displayed. If the appearance of the hinted glyph is not satisfactory, then the typographer can modify the existing graphical hints or add additional graphical hints until the appearance of the hinted glyph is satisfactory. The typographer can modify an existing graphical hint by selecting a portion of the graphical element and modifying the aspect of the hint that corresponds to that portion of the graphical element. For example, the typographer can modify the parent control point of a link by selecting the tail of an arrow representing the link and dragging the tail to a new parent control point.

A number of tools are provided by the graphical user interface, including viewing tools, control point tools, hinting tools and display tools. The display tools include snap shot, jump back and size run tools. The viewing tools include tools for panning, measuring, and zooming. The control point tools include tools for moving, swapping, deleting or adding a control point. The hinting tools include tools for linking, shifting, interpolating, aligning and moving, as well as tools for specifying an angle and a stroke.

The hinting tools allow the typographer to specify a hinting function. Typically, the typographer selects a hinting tool and then drags the selected tool between control points. Once the hinting tool and the control points are selected, the graphical hint is represented by a graphical element, such as an arrow, displayed on the glyph.

To hint a font using a graphical user interface, the typographer loads a font. Loading the font typically includes loading the necessary font data and stripping any hints previously created. Once the font is loaded, the typographer completes the control value table or cvt. The cvt is a font table defining the dominant width, length, or angle of a group of features, such as the stem width or the serif length. Completing the cvt typically includes measuring a number of representative glyphs using the measuring tool and using the most common values to complete the cvt. The typographer can specify cvt values when hinting a glyph. The ability to specify cvt values helps the typographer achieve consistency across the glyphs of the font.

Once the cvt is completed, the typographer selects a glyph to hint. The typographer hints the selected glyph by dragging and dropping graphical hints on the selected glyph. For example, to specify a link, the typographer selects the link tool. The typographer then drags the link tool between a first control point and a second control point. A graphical element, such as an arrow, appears between the two control points. The tail of the arrow is connected to the parent control point and the arrowhead is connected to the child control point. The typographer can specify options for the link, such as a stroke category option, a minimum distance option, or a cvt value by selecting the desired options from a menu. The selected stroke category option is represented by the shape of the arrowhead of the graphical element representing the link. The selected minimum distance option and the selected cvt value are represented by graphical components displayed with the graphical element.

The graphical user interface can be used to specify other types of hints, including an interpolation. To specify an interpolation, the typographer selects the interpolate tool. The typographer then drags the interpolate tool between a first control point and a second control point. A graphical element, such as a band, appears between the two control points. The band indicates that the two control points are the parent control points for the interpolation. The typographer selects the band and drags the band to a third control point. The graphical element changes from a band to a pair of arrows. The tail of one of the arrows is connected to the first control point and the arrowhead is connected to the third control point. The tail of the other arrow is connected to the second control point and the arrowhead is connected to the third control point. The pair of arrows is a graphical representation of the interpolation of the third control point between the first control point and the second control point.

The graphical element and the graphical components can be used to modify the graphical hints. By selecting different portions of the graphical element, different aspects of the hint are modified. For example, selecting the tail of the arrow representing a link or an interpolation allows the typographer to select a new parent control point. Selecting a graphical component representing the minimum distance option, allows the typographer to select a new minimum distance option.

If the automatic compile option is enabled, then the hints are automatically compiled as the glyph is hinted. The automatic compile option allows the typographer to immediately see the effect of a hint on the glyph. If the automatic compile option is not enabled, then a hint is not compiled until the typographer compiles the hint, typically by selecting a compile option from a menu.

Once the hints are compiled, the selected glyph is redisplayed. Typically, the selected glyph is displayed using the bitmap display option. If the appearance of the hinted glyph is not acceptable, then the typographer modifies or deletes the existing hints or adds additional hints until the appearance of the hinted glyph is acceptable. Once the appearance of the hinted glyph is acceptable, the typographer can hint another glyph. Additional glyphs are selected until all the glyphs of the font are hinted.

These and other aspects, features and advantages of the present invention may be more clearly understood and appreciated from a review of the following detailed description of the disclosed embodiments and by reference to the appended drawings and claims.

BRIEF DESCRIPTION OF THE DRAWINGS

FIGS. 10A, 10B, 10C, 10D, and 10E are flow diagrams illustrating the steps for hinting a font using a graphical user interface.

DETAILED DESCRIPTION

The present invention is directed to a method for authoring hints for a font using a graphical user interface. In one embodiment, the invention is incorporated into the "Visual TrueType" program marketed by Microsoft Corporation of Redmond, Wash. Briefly described, the graphical user interface of the "Visual TrueType" program permits a typographer to drag and drop graphical hints on a displayed glyph which can be automatically compiled into a font table. The typographer specifies a graphical hint by selecting a hinting tool which corresponds to a hinting function and selecting one or more points along the glyph outline, such as a control point. The graphical hints are represented by graphical elements displayed on the glyph. Options for the hints are represented by graphical components displayed with the graphical elements. The graphical hints are compiled and placed in the font tables without requiring that the typographer manually code the hints. Once the graphical hints for a glyph are compiled, the hinted glyph is displayed. The typographer can determine if the appearance of the hinted glyph is acceptable. If the appearance of the hinted glyph is not acceptable, then the typographer can add additional hints or modify the existing hints.

Exemplary Operating Environment

Figure 1:
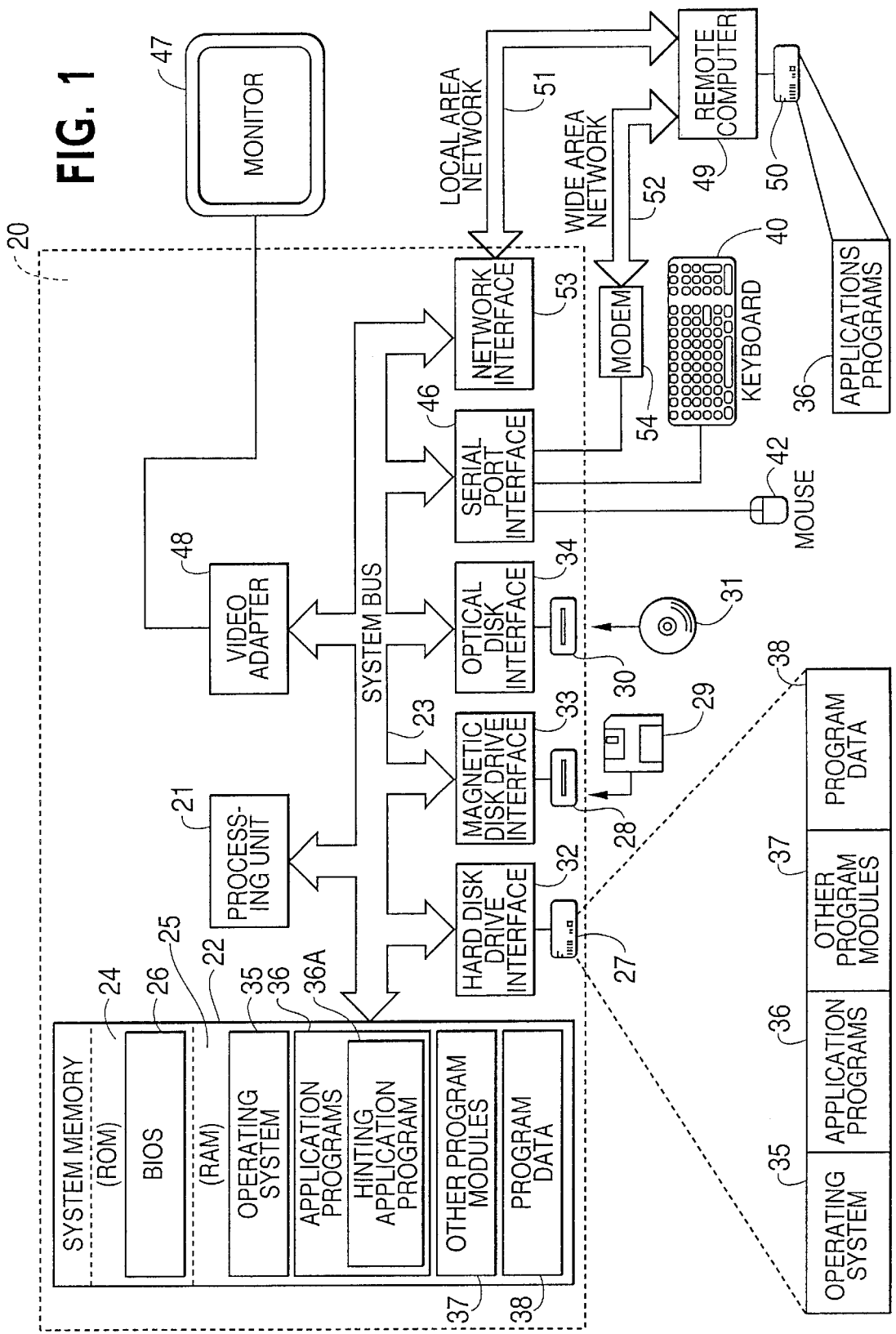
FIG. 1 is a block diagram of a personal computer illustrating the operating environment for an embodiment of the present invention.

FIG. 1 and the following discussion are intended to provide a brief, general description of a suitable computing environment in which the present invention may be implemented. While the invention will be described in the general context of a hinting application program used in connection with an operating system running on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory ("ROM") 24 and random access memory ("RAM") 25. A basic input/output system 26 ("BIOS"), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, including a hinting application program 36a, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus ("USB"). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a hard disk drive 50 has been illustrated in FIG. 1. The logical connections depicted in FIG. I include a local area network ("LAN") 51 and a wide area network ("WAN") 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

User Interface

Figure 2:
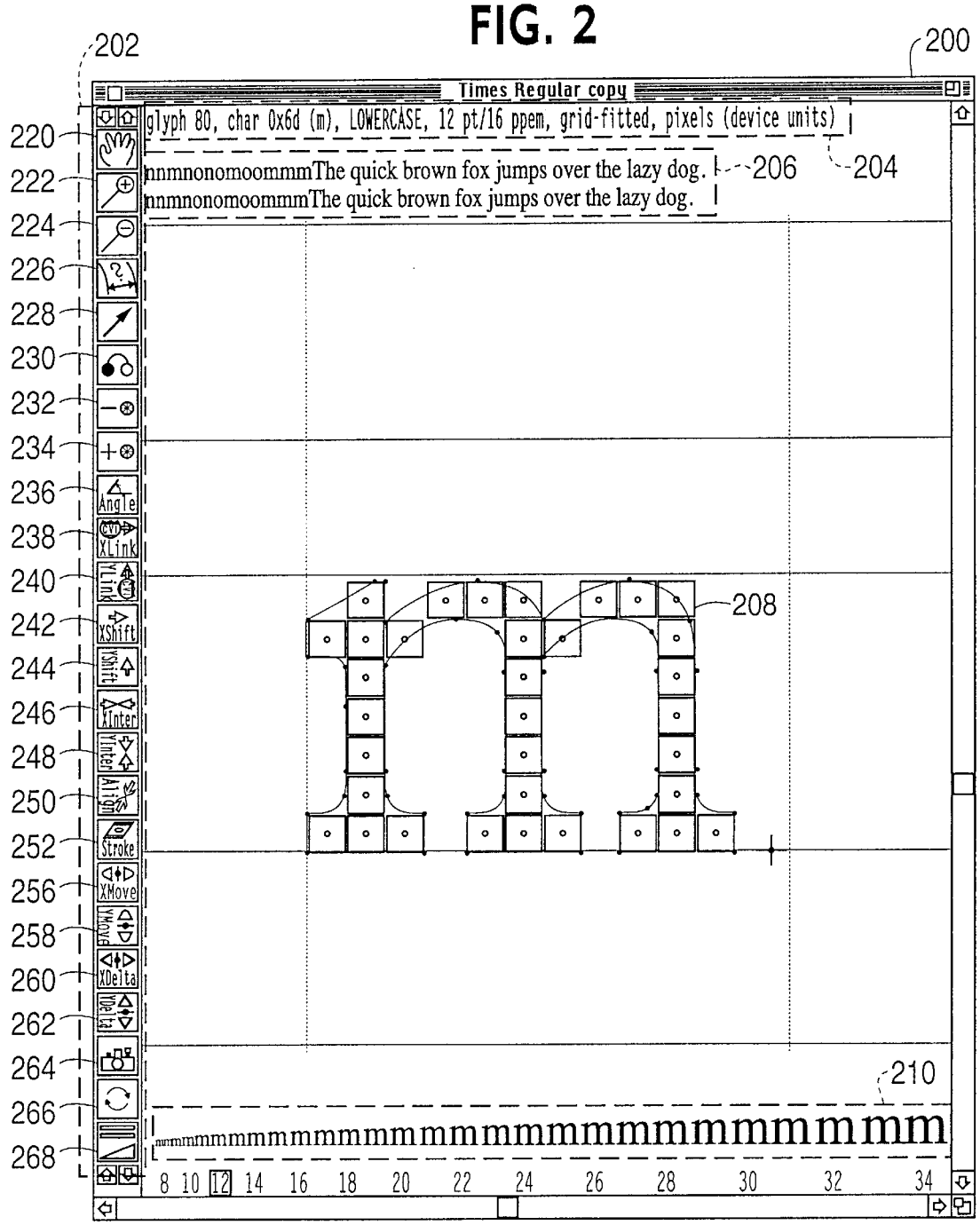
FIG. 2 is an illustration of a graphical user interface, including a toolbar and a selected glyph, in accordance with an embodiment of the present invention.

FIG. 2 illustrates the main window 200 of an exemplary graphical user interface for authoring hints for a font. As shown in FIG. 2, the main window includes a toolbar 202, a status bar 204, sample text for the font 206, a selected glyph 208, and a size run 210. In FIG. 2, the selected glyph is a lowercase "m" 208. The status bar 204 displays information about the selected glyph. For example, the status bar shown in FIG. 2 includes the glyph's sequential number in the font, the glyph's Unicode number, and the glyph's case, as well as other information. The sample text 206 provides the typographer with an indication of the overall look of the font. The size run 210 displays the selected glyph at different point sizes.

The selected glyph may be displayed using a variety of glyph display options. The glyph display options include displaying the glyph outline, displaying the control points, and/or displaying the pixels for the selected glyph. The glyph outline, the control points, the glyph bitmap, the pixels, and the pixel centers are displayed for the selected glyph shown in FIG. 2.

The toolbar shown in FIG. 2 contains viewing tools, control point tools, hinting tools and display tools. The tools are program modules that are associated with the hinting application program 36a of FIG. 1. The display tools include snap shot 264, jump back 266 and size run 268 tools. The viewing tools include tools for panning 220, measuring 226, and zooming 222, 224. The control point tools include tools for moving 228, swapping 230, deleting 232 or adding 234 a control point. The hinting tools include tools for linking 238, 240, shifting 242, 244, interpolating 246, 248, aligning 250, moving 256, 258, and "deltaing" 260, 262, as well as tools for specifying an angle 236 and a stroke 252. The tools also may be accessed via menus (not shown) or keystroke combinations. For example, the display tools can be accessed via menus and the viewing tools can be accessed via keystroke combinations. Additional tools and options are also available via menus. For example, the typographer can control which graphical hints are displayed on the selected glyph. The typographer can choose to display only x-direction hints or only y-direction hints. Typically, a typographer hints in one direction at a time so limiting the displayed hints to only the x-direction hints or only the y-direction hints makes it easier for the typographer to see the existing hints.

Display Tools

The display tools control what is displayed in the main window 200. The snap shot tool 264 creates a copy of the main window which is unaffected by subsequent changes to the selected glyph 208. The jump back tool 266 allows the typographer to switch between the last two glyphs selected using the Go to Glyph/Character command. Typically, the Go to Glyph/Character command is available via a menu. The size run tool 268 allows the typographer to enable or disable the display of the size run 210 and the sample text 206.

Viewing Tools

The viewing tools allow the typographer to control the view of the selected glyph. The panning tool 220 allows the typographer to precisely control the distance the selected glyph 208 is moved. The zoom-in tool 222 and the zoom-out tool 224 allow the typographer to resize the view of the selected glyph 208. The zoom-in tool 222 may be used to enlarge the view of the selected glyph 208 and the zoom-out tool 224 may be used to reduce the view of the selected glyph 208. The measuring tool 226 may be used to measure various distances on the selected glyph 208.

A typographer may use the measuring tool 226 to measure a set of representative glyphs to determine the initial values for the control value table ("cvt"). The cvt is a font table defining the dominant width, length, or angle of a group of features, such as stem width or serif length. Some cvt values are specific to certain glyphs, but other cvt values apply to the entire font. The cvt specifies cvt values for the different character groups of the font, such as uppercase, lowercase, figure and other.

Each entry in the cvt includes a cvt number, a cvt value and a comment field. A typical entry in the cvt is shown below:

287: 212(Uppercase Black X Round)

A cvt number is a sequential number identifying the entry in the cvt. In the entry shown above, the cvt number is 287. A cvt value gives the dominant length or width of a feature, measured in font units. Font units are units of measure that are independent of the device grid. During the scaling process, the cvt values are scaled to the device grid so that the cvt values are appropriate for the ppem size at issue. The term ppem refers to pixel per em. An em is a unit of measure which is the square of the point size. In the entry shown above, the cvt value is 212. The comment field provides information about the application of the cvt value. For example, in the entry shown above, the comment field indicates that the cvt value is applied to uppercase black round strokes in the x-direction.

Typically, the typographer completes the cvt before the typographer begins hinting. The typographer may complete the cvt by opening the cvt using a menu and then editing the entries of the cvt. Once the typographer completes the cvt, the cvt values may be used to hint the font. Hinting the font using cvt values helps the typographer obtain consistency between glyphs of the font.

Control Point Tools

The control point tools may be used to refine the glyph outline by adding, deleting or moving control points. Refining the glyph outline should reduce the amount of hinting required. Typically, the typographer selects one of the control point tools from the toolbar and then selects a control point on the glyph outline. For example, to add a control point, the typographer selects the add point tool 234 from the tool bar and then selects the location for the new control point. To delete a control point, the typographer selects the delete point tool 232 from the toolbar and then selects the control point to be deleted. To move a control point, the typographer selects the move point tool 228 from the tool bar and selects the control point to be moved. The typographer then drags the selected control point to a new location.

Once the typographer refines the glyph outlines using the control point tools, the typographer compiles the font so that the refined glyph outlines are stored in the font tables. Typically, the typographer then hints the refined glyphs.

During the hinting process, if the typographer decides to further refine a glyph outline, then the typographer can use the control point tools to modify the control points of the glyph.

Hinting Tools

The hinting tools allow the typographer to author hints by dragging and dropping graphical hints on a selected glyph. Dragging and dropping graphical hints on the selected glyph is similar to hinting by drawing critical relationships on a printed glyph using colored pencils. The typographer uses an input device, such as a mouse, to drag and drop graphical elements representing hints. As explained in more detail below, the typographer typically selects a hinting tool from the toolbar using the mouse and then drags the selected tool between control points. The tool represents a particular hinting function, such as a link or an interpolation. The hinting tools permit the typographer to add hints in the x-direction and/or the y-direction. The possible hinting functions are defined by the font format. The hinting functions discussed herein are supported by a TrueType font. Once the hinting tool and the control points are selected, the hint is represented by a graphical element displayed on the glyph.

The hinting tools allow the typographer to define attributes for control points, such as a rounding method, and relationships between control points, such as a link. Attributes and relationships are typically represented by graphical elements. For example, a link can be represented by an arrow. The graphical element provides the typographer with information about the hint. Preferably, the head of the arrow is connected to a child control point and the tail of the arrow is connected to a parent control point. The "color" of a graphical element indicates the flexibility of the relationship. For example, a white arrow indicates a high degree of flexibility, an arrow filled with lines indicates a medium level of flexibility, and a solid arrow indicates a low degree of flexibility. The orientation of the graphical element indicates the hinting direction. For example, an arrow with a horizontal arrowhead indicates that the hint is applied in the x-direction, whereas an arrow with a vertical arrowhead indicates that the hint is applied in the y-direction. Additional information regarding options for the graphical hint is provided by graphical components. For example, a graphical component can indicate the cvt number associated with the hint or the minimum distance option associated with the hint.

The typographer can modify the attributes, relationships, or options using the graphical element and/or the graphical components. For example, selecting the head of the arrow representing a hint allows the typographer to select a new child control point. Selecting the tail of the arrow representing a hint allows the typographer to select a new parent control point. Selecting the graphical component that corresponds to an option, such as the cvt number, allows the typographer to modify the option.

Link and Distance Tools

Figure 3A:
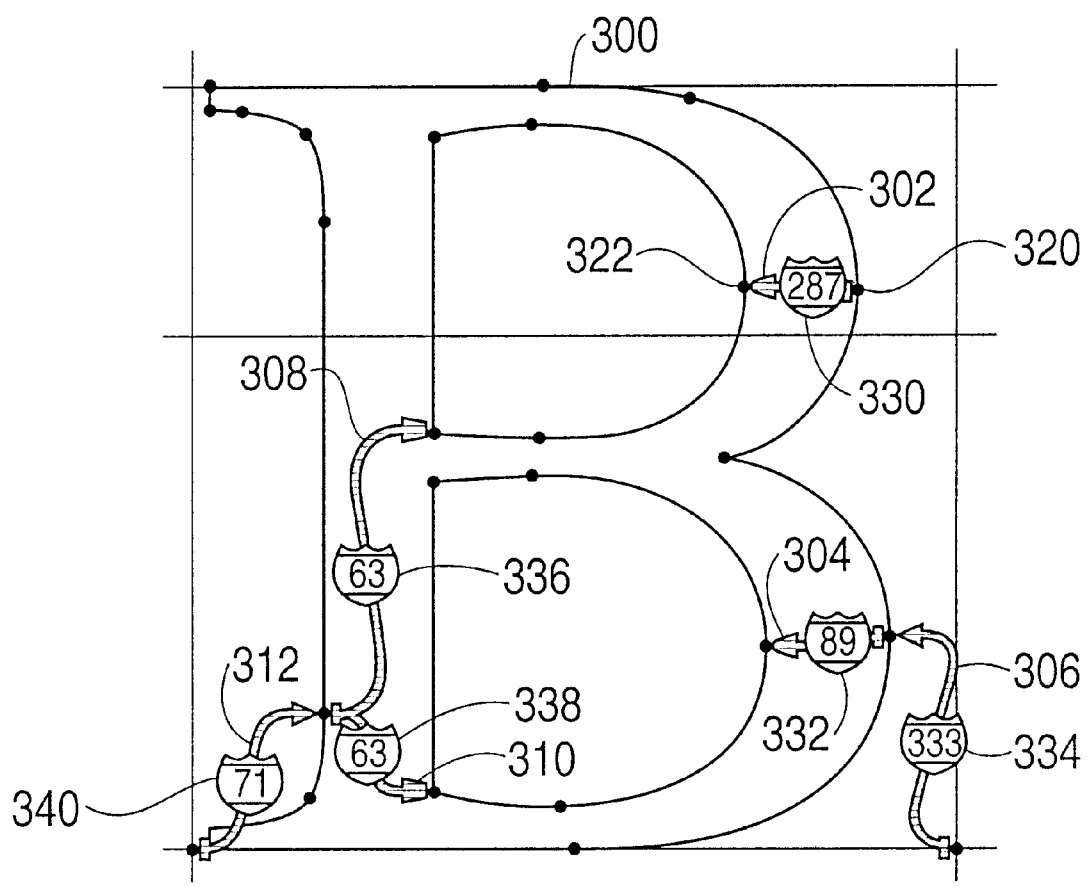
FIG. 3A is an illustration of links applied to a selected glyph, in accordance with an embodiment of the present invention.

A link connects two control points over a flexible distance in either the x-direction or the y-direction. A link begins at a parent control point and ends at a child control point. A link determines the location of the child control point relative to the parent control point. FIG. 3A illustrates six links for an uppercase "B" 300. One link 312 connects the left side bearing point and a control point on the vertical stem of the "B". Another link 306 connects the right side bearing point and a control point on the lower bowl of the "B". The width of the vertical stem is specified by links 308 and 310 and the width of the round strokes are specified by links 302 and 304.

To create a link, the typographer selects the link tool from the toolbar and then selects a parent control point and a child control point. Typically, once the link tool is selected, the cursor changes into an arrow with a highway sign. If the x-direction link tool (238 of FIG. 2) is selected, then the cursor changes into a horizontal arrow. If the y-direction link tool (240 of FIG. 2) is selected, then the cursor changes into a vertical arrow.

To create link 302, the typographer drags the link tool from the parent control point 320 to the child control point 322. As shown in FIG. 3A, the link is represented by a graphical element, such as an arrow 302, on the displayed glyph. The arrow 302 has a tail that is connected to the parent control point 320 and an arrowhead that is connected to the child control point 322. The arrow 302 is filled with lines to indicate the flexible nature of the link. If the link is in the x-direction, the arrow is filled with horizontal lines. If the link is in the y-direction, the arrow is filled with vertical lines. The arrow 302 is filled with horizontal lines indicating that the link is applied in the x-direction.

Typically, a typographer specifies a stroke category option, a minimum distance option, and possibly a cvt value for the link. The stroke category option indicates the type of stroke (straight, round, or other). The minimum distance option indicates the minimum distance between the parent control point and the child control point. The cvt value indicates the cvt number that is associated with the link. To specify the stroke category, the minimum distance, and the cvt value options, the typographer selects the link tool, depresses the shift key, selects the arrowhead of the graphical element for the link, and then selects the desired options from a menu. A typical horizontal menu and a typical vertical menu of stroke category and minimum distance options are shown in FIG. 3B.

Figure 3B:
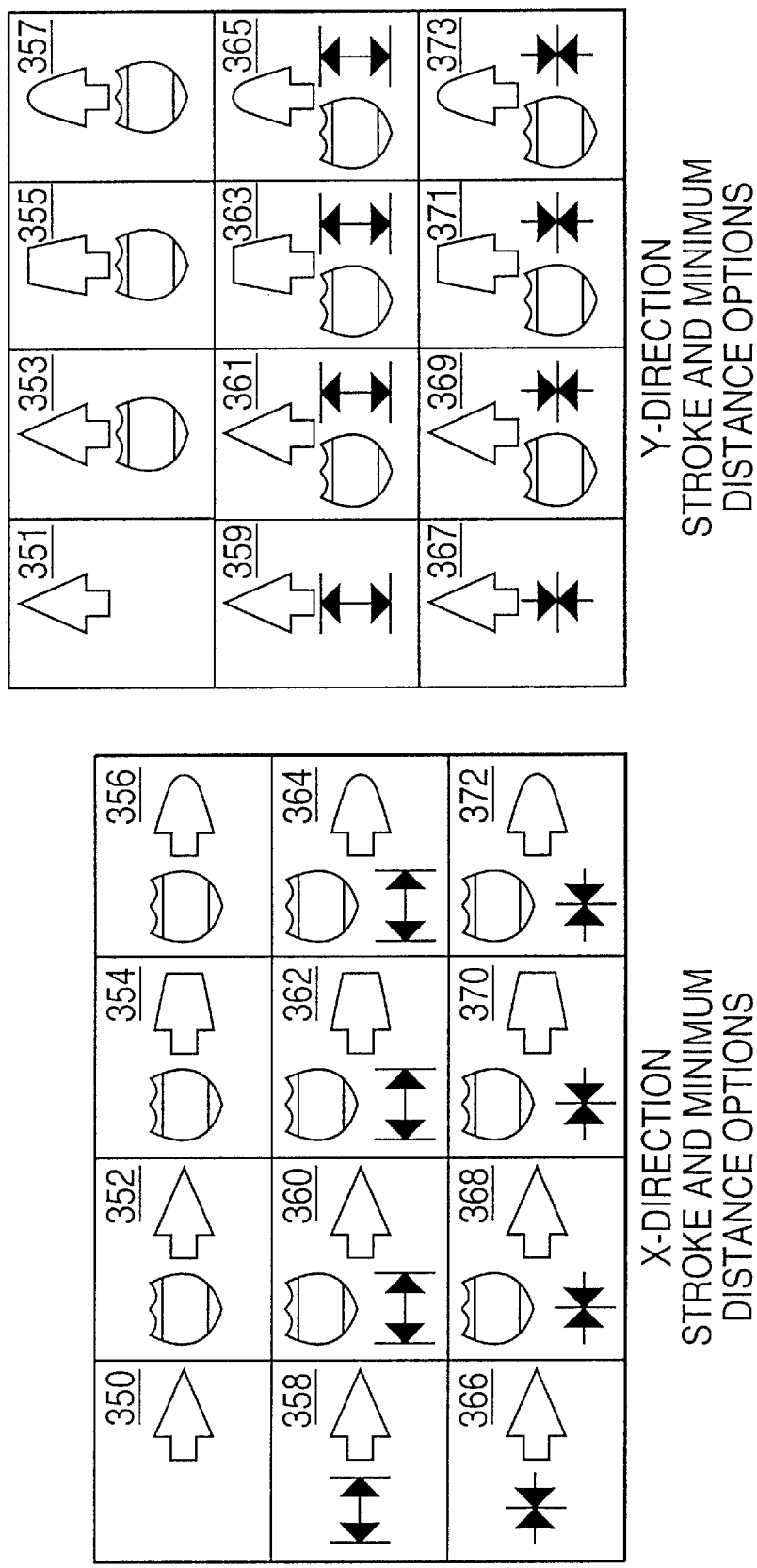
FIG. 3B is an illustration of the x-direction and y-direction stroke and minimum distance options, in accordance with an embodiment of the present invention.

The stroke category options shown in FIG. 3B include a pointed arrowhead (350, 351, 352, 353, 358, 359, 360, 361, 366, 367, 368, 369) to indicate that the link refers to a stroke that is neither straight nor rounded, a blunt arrowhead (354, 355, 362, 363, 370, 371) to indicate that the link refers to a straight stroke, and a rounded arrowhead (356, 357, 364, 365, 372, 373) to indicate that the link refers to a round stroke. The shape of the arrowhead of the graphical element indicates the stroke category option associated with the link. For example, the arrowhead of link 304 of FIG. 3A is rounded indicating that link 304 refers to a round stroke.

The typographer also may specify a minimum distance option for the link or distance using the menus shown in FIG. 3B. The default minimum distance option instructs the rasterizer to maintain a minimum distance between the parent control point and the child control point in certain situations. The typographer can override the default option and instruct the rasterizer to maintain a minimum distance when the default option would not maintain a minimum distance or to ignore a minimum distance when the default option would maintain a minimum distance. The options in the menu include the default option (no symbol) and the override options (elevator door symbols). For the option of maintaining a minimum distance when the default option would not maintain a minimum distance, the elevator door symbol is an open door symbol (a vertical line with opposite pointing arrowheads on either side of the line), e.g. 358–365. For the option of ignoring a minimum distance when the default option would maintain a minimum distance, the elevator door symbol is a close door symbol (a vertical line with arrowheads on either side of the line that point towards the line), e.g. 366–373. The minimum distance override option can be represented by a graphical component displayed near the graphical element for the link. Typically, the graphical component is an elevator door symbol.

In addition to specifying a stroke category option and a minimum distance option, the menus shown in FIG. 3B also permit the typographer to specify a cvt value for the link. To specify a cvt value, the typographer selects an option that includes a highway sign, e.g. 352–357, 360–365 and 368–373. If the link does not refer to a cvt value, then the typographer selects an option without a highway sign, e.g. 350, 351. To indicate that the link refers to a cvt value, a graphical component, such as a highway sign, is displayed. For example, as shown in FIG. 3B, links 302, 304, 306, 308, 310, and 312 include highway signs 330, 332, 334, 336, 338, and 340 displaying the cvt numbers for the links.

If the link does not refer to a cvt value, then the link is a distance. A distance does not relate to any other glyph in the font. Because a distance does not refer to a cvt value, the graphical element for the distance does not include a highway sign with a cvt number.

As the typographer hints the glyph, the typographer may decide to modify or to delete a link. To modify a link to specify a different parent control point, the typographer selects the link tool, selects the tail of the arrow, and drags the tail to a new parent control point. To modify a link to specify a different child control point, the typographer selects the link tool, selects the arrowhead, and drags the arrowhead to a new child control point. To delete a link, the typographer selects the link tool from the toolbar, selects the arrowhead of the link to be deleted, and drags the arrowhead off the child control point.

The typographer may modify the stroke category, the minimum distance, or the cvt value options associated with a link. To modify the stroke category option associated with the link, the typographer depresses the shift key, selects the arrowhead, and then selects a new stroke category. To modify the minimum distance option applied to the link, the typographer depresses the shift key, selects the elevator door symbol, and then selects a new minimum distance option. To modify the cvt value associated with the link, the typographer depresses the shift key, selects the highway sign, and then selects a new cvt value.

An advantage of hinting a glyph using a graphical user interface is that a typographer can see the hints applied to the glyph and can recognize hinting errors. For example, links cannot be circular. If the typographer mistakenly specifies circular links, then the graphical elements representing the links will be interconnected. It is easier for the typographer to recognize the interconnected graphical elements displayed on the glyph than to recognize the lines of assembly-type code which represent the circular links.

Shift Tool

The shift tool is similar to the link tool, but the shift tool creates a rigid relationship between a parent control point and a child control point. The same relative distance is maintained between the two control points even if the parent control point is moved due to other hinting. A shift is useful for defining a unique relationship between a parent control point and a child control point.

To create a shift, the typographer selects the shift tool from the toolbar. Typically, once the shift tool is selected, the cursor changes into an arrowhead. If the x-direction shift tool (242 of FIG. 2) is selected, then the cursor changes into a horizontal arrowhead. If the y-direction shift tool (244 of FIG. 2) is selected, then the cursor changes into a vertical arrowhead. The typographer drags the arrowhead from the parent control point to the child control point. The shift is represented by a graphical element, such as an arrow. Typically, the arrow is solid to distinguish the shift from a link and to indicate the rigid relationship defined by the shift.

To modify an existing shift, the typographer selects the shift tool and selects either the parent control point or the child control point. To change the parent control point, the typographer drags the tail of the arrow to the new parent control point. To change the child control point, the typographer drags the arrowhead to the new child control point. To delete a shift, the typographer selects the shift tool and drags the arrowhead off the child control point.

Interpolate Tool

Figure 4A:
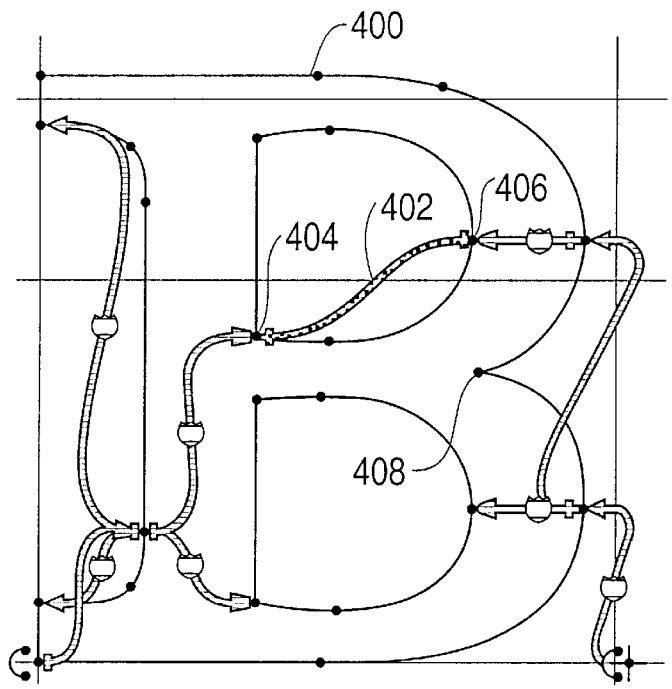
FIGS. 4A and 4B are illustrations of an interpolation applied to a selected glyph, in accordance with an embodiment of the present invention.
Figure 4B:
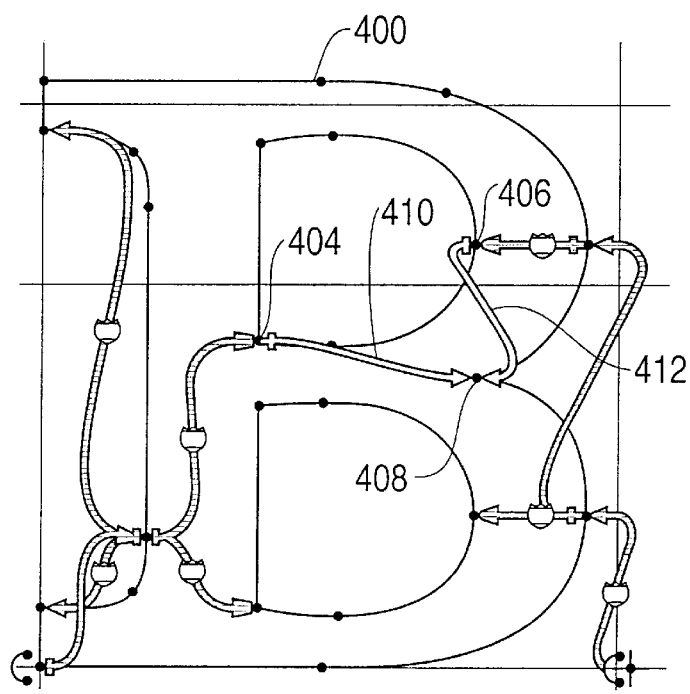

The interpolate tool controls the proportions of a glyph by maintaining the relative position of one or more child control points that fall between two parent control points. The proportions are controlled in either the x-direction or the y-direction. FIGS. 4A and 4B illustrate an interpolation for an uppercase "B" 400. To create a interpolation, the typographer selects the interpolate tool from the toolbar. Typically, once the interpolate tool is selected, the cursor changes into a pair of arrowheads pointing towards a point. If the x-direction interpolate tool (246 of FIG. 2) is selected, then the cursor changes into a horizontal pair of arrowheads. If the y-direction interpolate tool (248 of FIG. 2) is selected, then the cursor changes into a vertical pair of arrowheads. The typographer connects the parent control points, typically by dragging the interpolate tool between the two points. As shown in FIG. 4A, a band 402 appears connecting the two parent control points 404, 406. The typographer selects the band 402 and drags the band to the child control point 408. Once the child control point 408 is selected, the band 402 changes into a graphical element representing the interpolation. For example, the interpolation shown in FIG. 4B is represented by a pair of arrows 410, 412. Each arrow has a tail at the parent control point and an arrowhead at the child control point. The arrows are white to indicate the highly flexible nature of the interpolation.

An existing interpolation can be modified to specify different parent control point(s) or different child control point(s). To modify a parent control point, the typographer selects the interpolate tool, selects the tail of the arrow associated with the parent control point, and drags the tail of the arrow to a new parent control point. To modify a child control point, the typographer selects the interpolate tool, selects an arrowhead associated with the child control point, and drags the arrowhead to a new child control point. The arrowhead of the other arrow is automatically moved to the new child control point. Automatically moving the arrowhead to the new child control point prevents the illegal interpolation of a child control point with only a single parent control point.

To delete an interpolation, the typographer selects the interpolate tool from the toolbar, selects the arrowhead of one of the arrows representing the interpolation and drags the arrowhead off the child control point. The arrowhead of the other arrow is automatically deleted. Automatically deleting the arrowhead prevents the illegal interpolation of a child control point with only a single parent control point.

Rounding Tools

Figure 5:
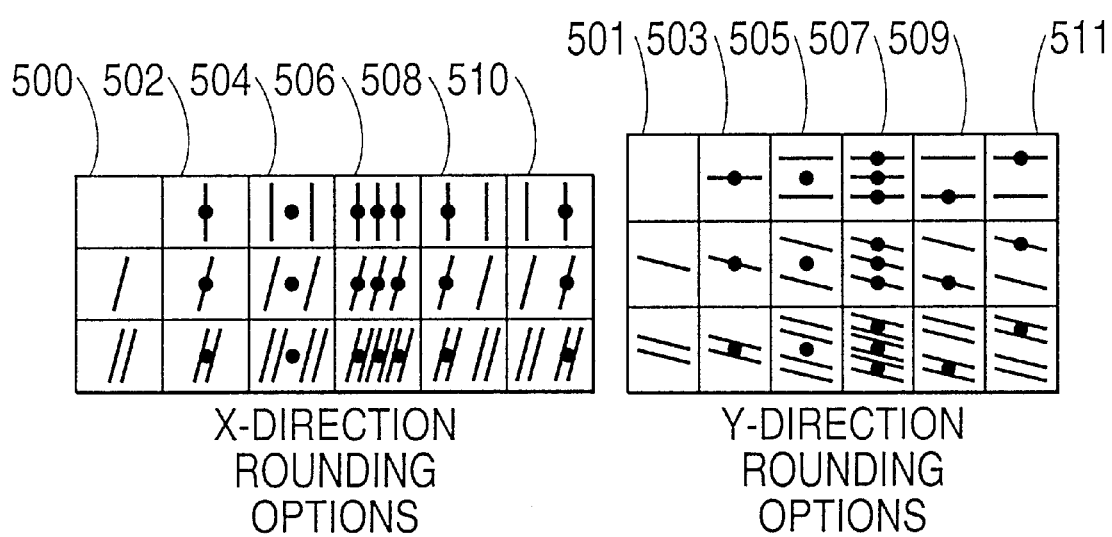
FIG. 5 is an illustration of the x-direction and y-direction rounding options, in accordance with an embodiment of the present invention.

The rounding tools are used to specify the position of a control point relative to the grid lines. The typographer may specify rounding options for a control point when applying a hint, such as a link, shift or interpolation. To specify a rounding option, the typographer depresses the shift key, selects a control point, and selects the desired rounding option from a menu. Typical horizontal rounding options and vertical rounding options are shown in FIG. 5. The rounding options include (1) fit the control point to the grid without rounding it 500, 501; (2) fit the control point to the nearest grid line ("round to grid") 502, 503; (3) fit the control point halfway between two grid lines ("round to halfgrid") 504, 505; (4) fit the control point to the nearest grid line or halfway between two grid lines, whichever is closer ("round-to-double-grid") 506, 507; (5) fit the control point to the next lower grid line ("round down to grid") 508, 509; and (6) fit the control point to the next higher grid line ("round up to grid") 510, 511. Rounding options 500–511 round the control point relative to the x-direction or the y-direction grid lines. The remaining rounding options shown in FIG. 5 round the control point relative to the main stroke angle or to the adjusted italic angle. The selected rounding option is represented by a graphical component. For example, the graphical component may correspond to the graphical components displayed in the rounding menus shown in FIG. 5.

To modify a rounding option, the typographer depresses the shift key, selects the control point, and selects a different one of the rounding methods from the menu. To delete a rounding option, the typographer depresses the shift key, selects the control point, and selects the option to fit the control point to the grid without rounding from the menu.

Stroke Tool

Figure 6:
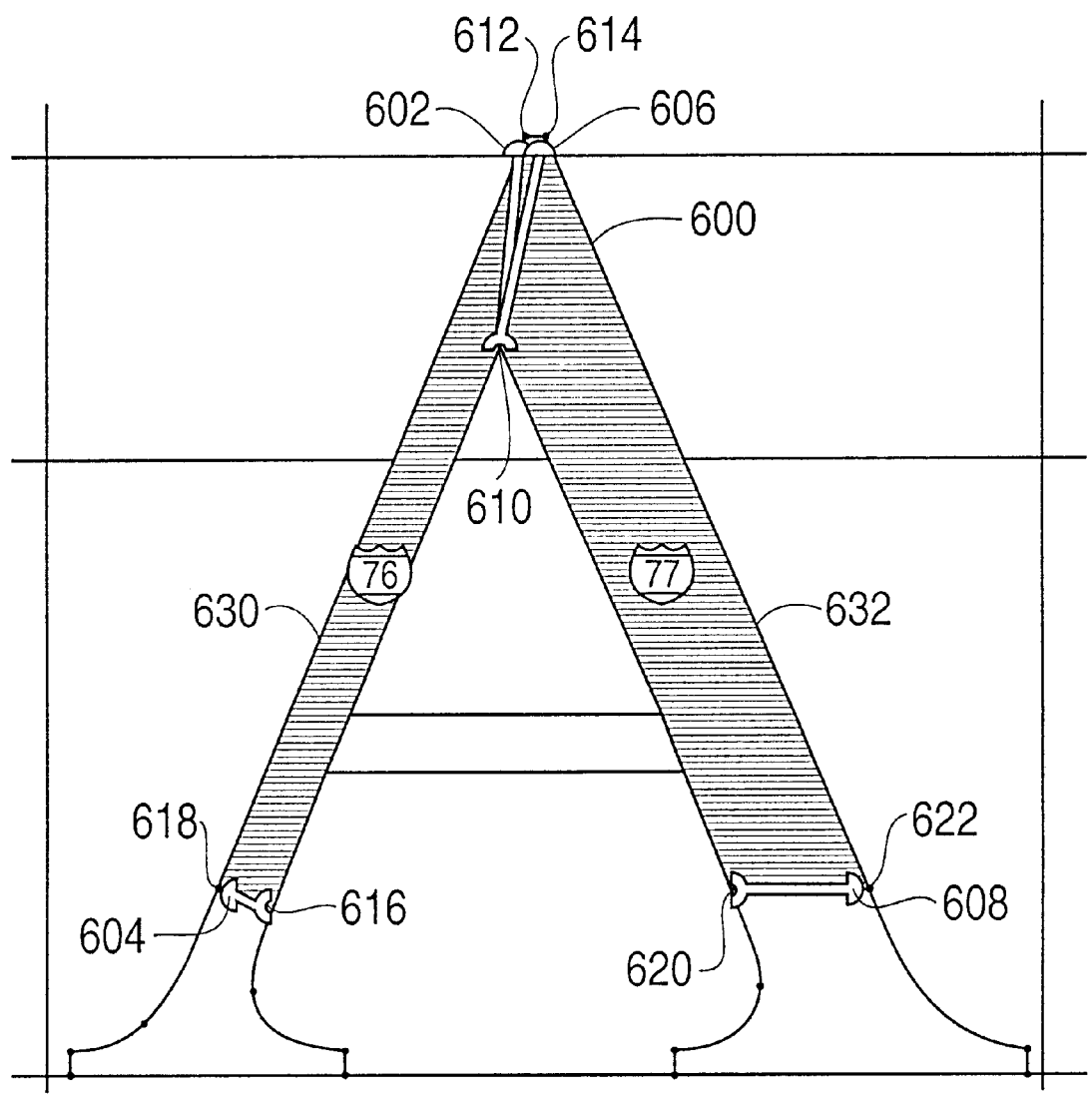
FIG. 6 is an illustration of strokes applied to a selected glyph, in accordance with an embodiment of the present invention.

The stroke tool is used to hint glyphs with diagonal strokes, such as an uppercase "A" or italic glyphs. The stroke tool ensures a uniform width of a diagonal stroke by linking a first parent-child control point pair to a second parent-child control point pair. FIG. 6 illustrates two strokes 630 and 632 defining the widths of the diagonals of an uppercase "A" 600. To create a stroke, the typographer selects the stroke tool (252 of FIG. 2) from the toolbar. Typically, once the stroke tool is selected, the cursor changes into a pair of parallel arrowheads pointing in opposite directions. To create stroke 630, the typographer selects the first parent control point 610 and drags the stroke tool to the first child control point 612. Typically, an arrow 602 is displayed beginning at the first parent control point 610 and ending at the first child control point 612. The typographer then selects the second parent control point 616 and drags the stroke tool to the second child control point 618. A second arrow 604 is displayed beginning at the second parent control point 616 and ending at the second child control point 618. The area between the first parent-child pair and the second parent-child pair is filled with parallel lines, indicating that the two arrows define a stroke. If the stroke is within forty-five degrees (45°) of vertical, then the lines are horizontal; otherwise the lines are vertical. The stroke 630 is represented by the graphical element including the arrows 602 and 604 and the horizontal lines.

A stroke can be modified to specify a different parent control point or a different child control point. To specify a new parent control point, the typographer selects the stroke tool, selects the tail of the arrow associated with the parent control point, and drags the tail of the arrow to a new parent control point. To specify a new child control point, the typographer selects the stroke tool, selects the arrowhead of the arrow associated with the child control point, and drags the arrowhead to a new child control point.

To delete a stroke, the typographer selects the stroke tool from the toolbar, selects one of the child control points and drags the arrowhead off the child control point. The typographer then selects the other child control point and drags the arrowhead off that child control point.

The Align Tool

Figure 7:
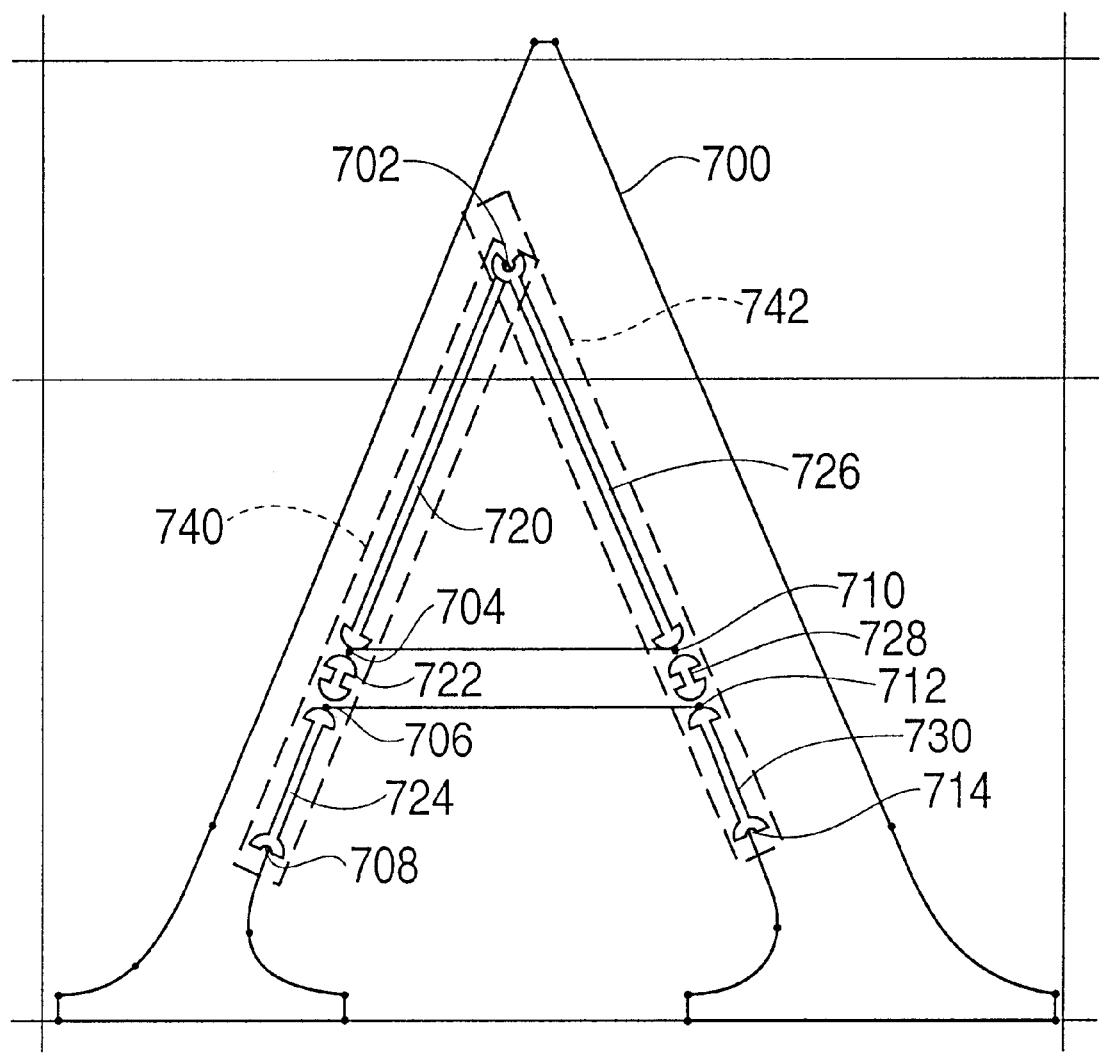
FIG. 7 is an illustration of alignments applied to a selected glyph, in accordance with an embodiment of the present invention.

The align tool allows the typographer to specify that three or more control points should be kept along the same line. The align tool keeps the child control points aligned even though other hints are applied to the parent control points. If the child control points are not aligned, then the child control points may become distorted once other hints are applied to the parent control points. FIG. 7 shows two aligns 740 and 742 applied to an uppercase "A" 700. To create an alignment, the typographer selects the align tool (250 of FIG. 2) from the toolbar. Typically, once the align tool is selected the cursor changes into two diagonal arrowheads pointing towards each other. To create alignment 740, the typographer selects the first parent control point 702 and drags the align tool to the second parent control point 708. A headless arrow is displayed with a rounded tail at each parent point. The typographer drags the shaft of the arrow to one or more child control points 704, 706 located between the two parent control points 702 and 708. The align 740 is represented by a graphical element, such as a set of arrows connecting all the aligned control points. Each align is represented by a set of arrows 720, 722, 724 and 726, 728, 730 with rounded arrowheads at the child control points 704, 706 and 710, 712 and a rounded tail at the parent control points 702, 708 and 702, 714.

An alignment can be modified to specify a different parent control point or a different child control point. To specify a new parent control point, the typographer selects the align tool, selects the tail of the arrow associated with the parent control point, and drags the tail of the arrow to a new parent control point. To specify a new child control point, the typographer selects the align tool, selects the arrowhead of the arrow associated with the child control point, and drags the arrowhead to a new child control point. To delete an align, the typographer drags the rounded arrowhead off the child control point.

The Angle Tool

Figure 8:
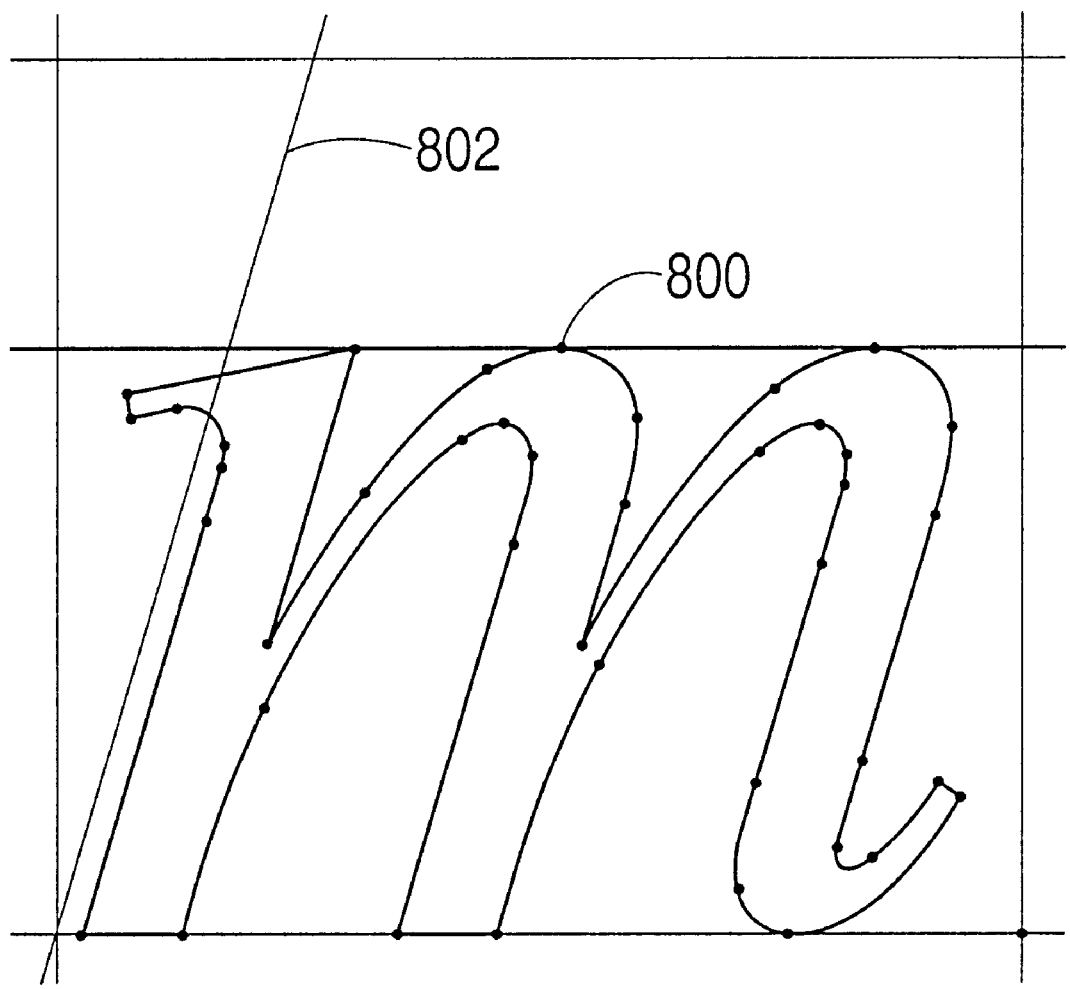
FIG. 8 is an illustration of an angle applied to a selected glyph, in accordance with an embodiment of the present invention.

The angle tool allows the typographer to specify the stroke angle for an italic font. To specify a stroke angle, the typographer selects the angle tool (236 of FIG. 2) from the toolbar. Typically, once the angle tool is selected, the cursor changes into a protractor. The typographer selects a point, usually the left side bearing point, and a straight line appears. The straight line rotates as the typographer drags the angle tool to specify the desired angle. The stroke is represented by a graphical character, such as a sloped line 802, as shown in FIG. 8. FIG. 8 shows the stroke angle of an italic lowercase "m" 800.

Exception Tools

At some point sizes the typographer may need to create an exception to the global hinting to improve the pixel pattern around the round parts of a glyph. Two types of exceptions may be applied to a control point, a delta exception and a move exception. A delta exception moves the control point a set number of pixel(s) based on the ppem size. A delta exception applies only to a particular point size. A move exception moves a control point a set number of pixel(s) regardless of the ppem size of the glyph.

To create an exception, the typographer selects one of the exception tools from the toolbar and then selects a control point. Typically, if the delta exception tool is selected, the cursor changes into a double headed arrow with pointed arrowheads. If the x-direction delta exception tool (260, FIG. 2) is selected, then the cursor changes into a horizontal arrow. If the y-direction delta exception tool (262, FIG. 2) is selected, then the cursor changes into a vertical arrow. If the move exception tool is selected, then the cursor changes into a double headed arrow with rounded arrowheads. If the x-direction move exception tool (256, FIG. 2) is selected, then the cursor changes into a horizontal arrow. If the y-direction move exception tool (258, FIG. 2) is selected, then the cursor changes into a vertical arrow.

Figure 9:
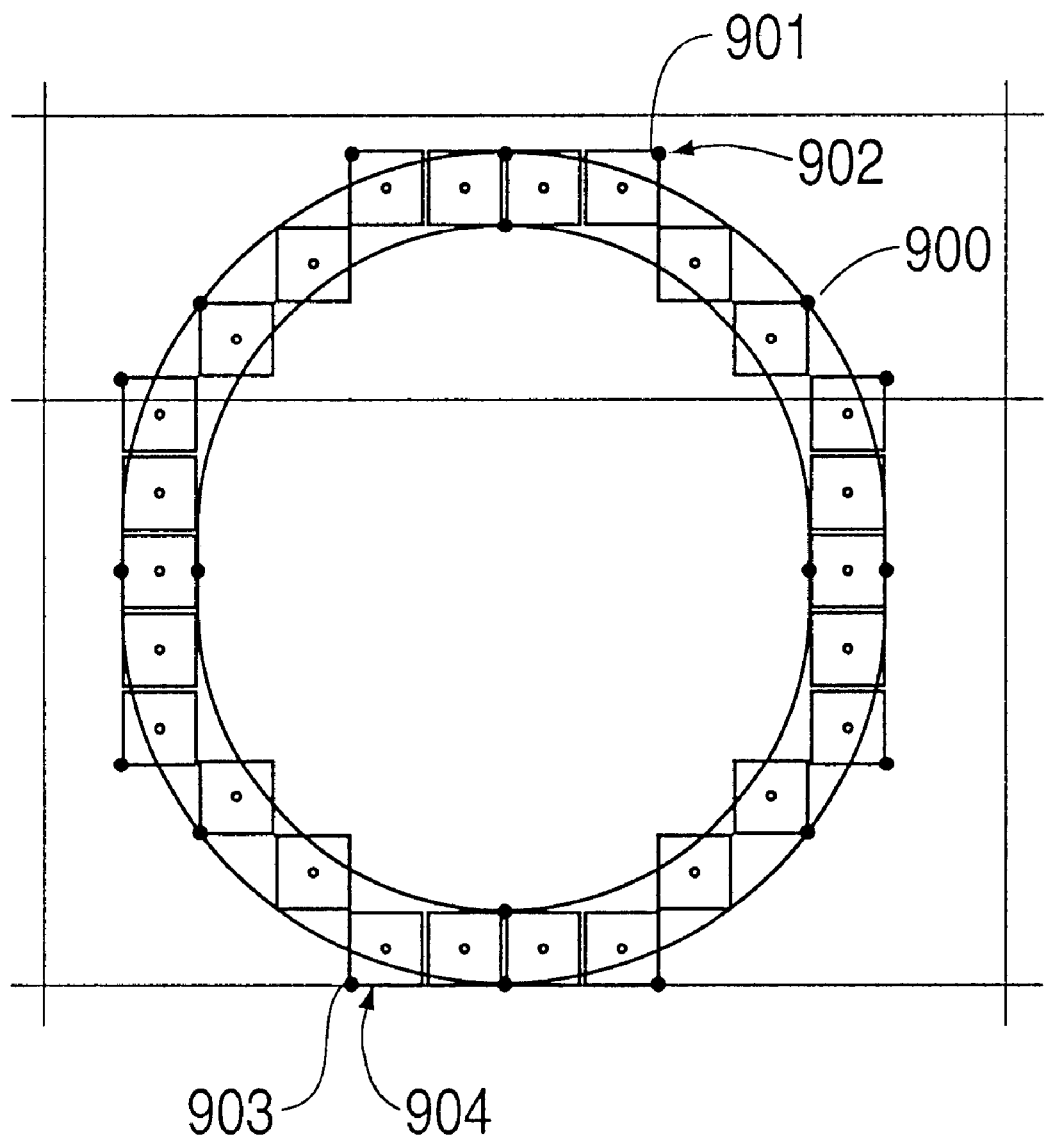
FIG. 9 is an illustration of a delta exception applied to a selected glyph, in accordance with an embodiment of the present invention.

Once the exception tool and the control point are selected, a ruler is displayed. The ruler is horizontal for a horizontal exception tool and vertical for a vertical exception tool. The typographer drags the cursor to the desired value on the ruler. The ruler has a range of plus-or-minus eight pixels, with increments as fine as ¹⁄₆₄ pixel or as coarse as one pixel. The typographer can change the displayed range of the ruler and the displayed increments. The selected control point is moved in accordance with the value selected on the ruler. An exception is represented by a graphical element, such as a pointed triangle (delta exception) or a round-tip triangle (move exception), located about the selected control point. FIG. 9 shows two delta exceptions 902, 904 applied to an uppercase "O" 900. As shown in FIG. 9, the graphical element 902, 904 is positioned near the affected control point 901, 903.

To delete an exception, the typographer selects the exception tool (delta or move), selects the control point and selects the value zero (0) on the ruler.

Method for Hinting a Font

The typographer may hint a font, such as a TrueType font, that was created using an outline editor. Before beginning to hint the font, the typographer can select the resolution of the target output device. The resolution of the target output device determines the number of pixels available to render the glyphs of the font.

Figure 10A:
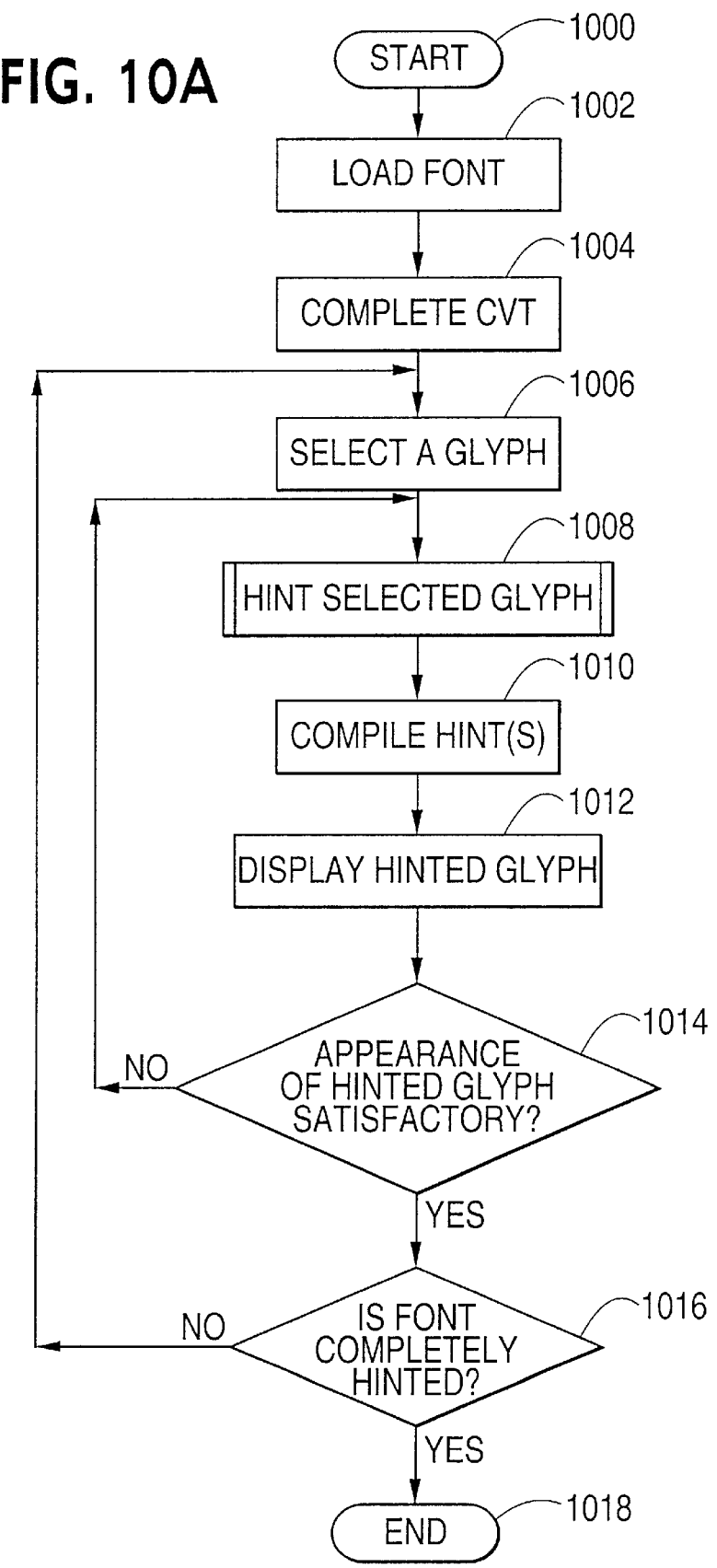

The steps for hinting a font are shown in FIG. 10A. The method begins at step 1000 and proceeds to step 1002. In step 1002, the font is loaded. Loading the font typically includes loading the necessary font data and stripping any hints previously created. Once the font is loaded, the typographer completes the cvt in step 1004. The step of completing the cvt typically includes measuring a number of representative glyphs using the measuring tool and using the most common values to complete the cvt. Once the cvt is completed, the typographer selects a glyph to hint in step 1006. The typographer hints the selected glyph in step 1008 by dragging and dropping graphical hint(s) on the selected glyph. The steps for hinting the selected glyph are discussed below in connection with FIGS. 10B–10E. In step 1010, the hint(s) are compiled. If the automatic compile option is enabled, then each hint is compiled as it is added. If the automatic compile option is not enabled, then the hint is not compiled until the typographer initiates the compilation. The automatic compile option allows the typographer to immediately see the effect of a hint on the glyph. However, in some instances, the typographer may choose not to enable the automatic compile option because the automatic compile option can make it difficult to add multiple hints. Additional details on compiling graphical hints is described in the commonly assigned U.S. patent application Ser. No. 09/049,777 for A System and Method for Representing Graphical Font Data and for Converting the Font Data to Font Instructions which is incorporated herein by reference.

In step 1012, the hinted glyph is displayed. Typically, the selected glyph is displayed using the bitmap display option. The hinted glyph is reviewed in step 1014. If the appearance of the hinted glyph is not acceptable, then the No branch is followed from step 1014 back to step 1008. Steps 1008, 1010, and 1012 are repeated until the appearance of the hinted glyph is acceptable. The typographer may add additional hints or modify or delete the existing hints to achieve the desired appearance. Once the appearance of the hinted glyph is acceptable, the method proceeds along the Yes branch from step 1014 to step 1016. In step 1016, a determination is made as to whether the font is completely hinted. If additional glyphs of the font need to be hinted, then the method follows the No branch back to step 1006 and another glyph is selected. Glyphs are selected until all the glyphs of the font are hinted. Once the determination in step 1016 is that all the glyphs of the font are hinted, then the method follows the Yes branch and the method ends at step 1018.

The steps for hinting a font are shown in FIG. 10A. The method begins at step 1000 and proceeds to step 1002. In step 1002, the font is loaded. Loading the font typically includes loading the necessary font data and stripping any hints previously created. Once the font is loaded, the typographer completes the cvt in step 1004. The step of completing the cvt typically includes measuring a number of representative glyphs using the measuring tool and using the most common values to complete the cvt. Once the cvt is completed, the typographer selects a glyph to hint in step 1006. The typographer hints the selected glyph in step 1008 by dragging and dropping graphical hint(s) on the selected glyph. The steps for hinting the selected glyph are discussed below in connection with FIGS. 10B–10E. In step 1010, the hint(s) are compiled. If the automatic compile option is enable, then each hint is compiled as it is added. If the automatic complied option is not enabled, then the hint is not compiled until the typographer initiates the compilation. The automatic compile option allows the typographer to immediately see the effect of a hint on the glyph. However, in some instances, the typographer may choose not to enable the automatic compile option because the automatic compile option can make it difficult to add multiple hints. Additional details on compiling graphical hints is described in the commonly assigned U.S. patent application Ser. No. 09/049,777 for A System and Method for Representing Graphical Font Data and for Converting the Font Data to Font Instructions which is incorporated herein by reference.

Figure 11A:
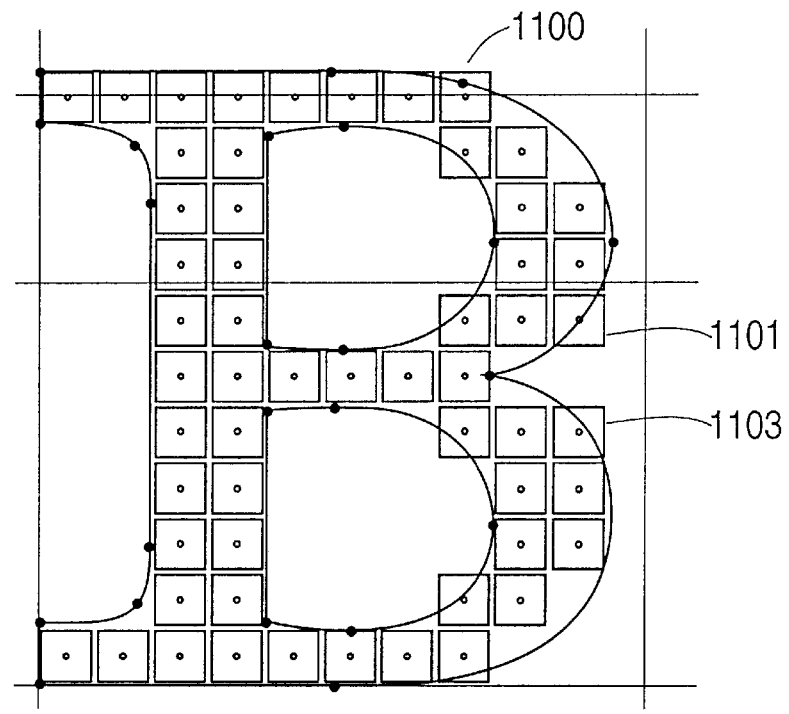
FIGS. 11A, 11B, 11C, and 11D are illustrations of the application of the steps of FIG. 10A and 10B, in accordance with an embodiment of the present invention.
Figure 11B:
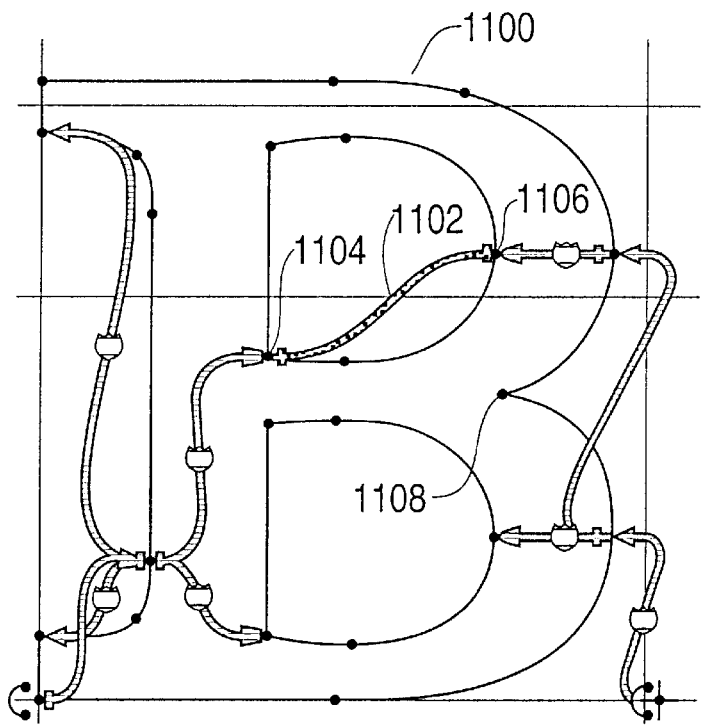
Figure 11C:
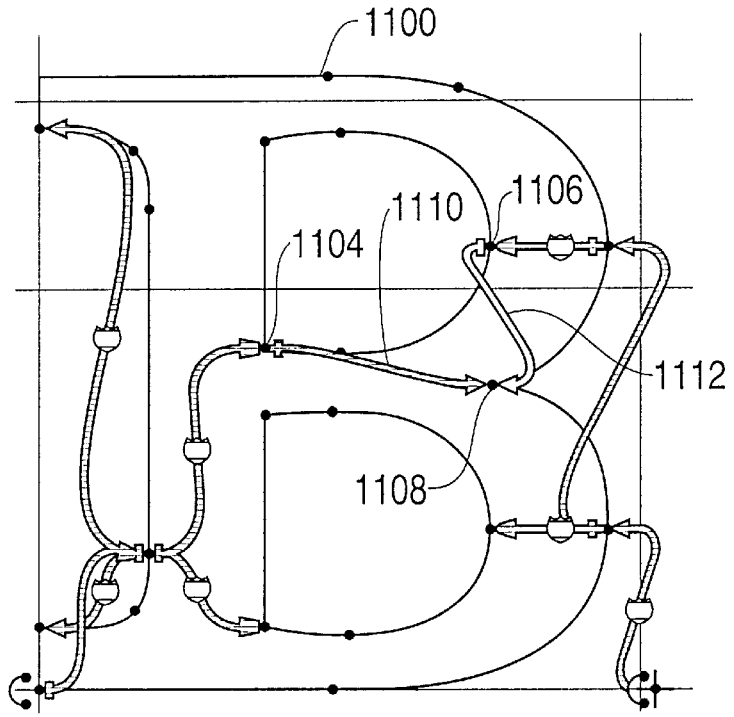
Figure 11D:
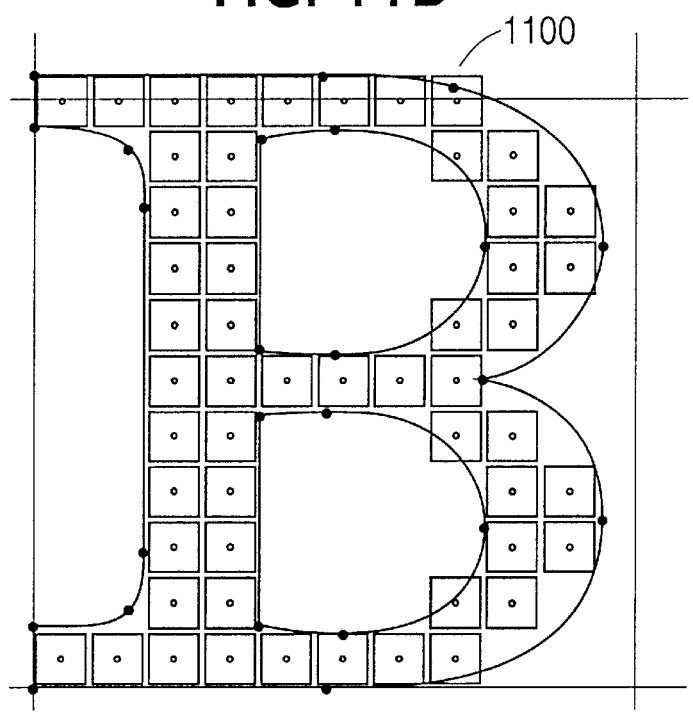

FIGS. 11A–11D may be used to illustrate an exemplary application of steps 1008, 1010, and 1012 of FIG. 10A and the steps of FIG. 10B. FIG. 11A shows a bitmap for an uppercase "B" 1100. As shown in FIG. 11A, the bitmap has a dent in both the upper and lower bowls of the "B". The dent in the upper bowl is attributed to the activation of pixel 1101 and the dent in the lower bowl is attributed to the activation of pixel 1103. To eliminate the dent in the lower bowl, the typographer hints the selected glyph by interpolating, as shown in FIG. 11B and 11C. The typographer interpolates by selecting a first control point 1104 and a second control point 1106. Once the typographer selects the two control points, a band 1102 appears between the two control points 1104, 1106 as shown in FIG. 11B. The typographer selects the band and drags the band to the third control point 1108. Once the third control point 1108 is selected, the band changes into a pair of arrows 1110, 1112 as shown in FIG. 11C. Although FIG. 11B and 11C show the typographer hinting the glyph outline, the typographer could choose to hint the bitmapped glyph instead. To see the effect of the interpolation, the hint must be compiled. Once the hint is compiled, the bitmap of the hinted glyph is displayed, as shown in FIG. 11D. The bitmap shown in FIG. 11D shows that the interpolation eliminated the dent in the lower bowl by deactivating pixel 1103, as well as eliminating the dent in the upper bowl by deactivating pixel 1101.

Figure 10C:
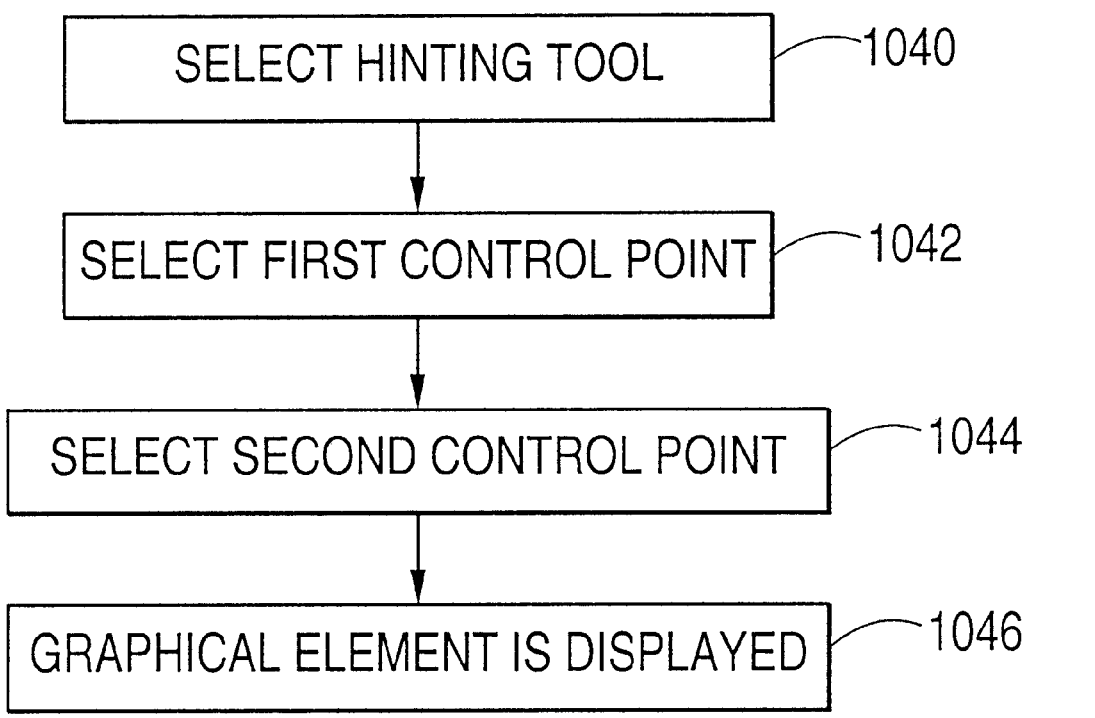

FIG. 10C corresponds to creating a relationship between two control points, such as a link or a shift. As shown in FIG. 10C, the typographer selects a hinting tool in step 1040. For example, the typographer can select the link hinting tool from the toolbar. If the typographer selects the link tool, the cursor changes into an arrow as discussed above in connection with the link tool. The typographer selects the first control point in step 1042 and drags the link tool to select the second control point in step 1044. The first control point is equivalent to the parent control point and the second control point is equivalent to the child control point discussed above in connection with the link tool. A graphical element is displayed in step 1046. For the link, the graphical element is an arrow connecting the first control point and the second control point.

FIG. 10D corresponds to creating a relationship between two pairs of control points, such as a stroke. As shown in FIG. 10D, the typographer selects a hinting tool in step 1050. For example, the typographer can select the stroke hinting tool from the toolbar. If the typographer selects the stroke hinting tool, the cursor changes into a pair of parallel arrowheads as discussed above in connection with the stroke tool. The typographer selects the first control point in step 1052 and drags the stroke tool to select the second control point in step 1054. The first control point and the second control point are equivalent to the first parent-child pair discussed above in connection with the stroke tool. A first graphical element is displayed in step 1056. For the stroke, the first graphical element is an arrow connecting the first control point and the second control point. The typographer then selects a third control point in step 1058 and drags the stroke tool to select a fourth control point in step 1060. The third control point and the fourth control point are equivalent to the second parent-child pair discussed above in connection with the stroke tool. A second graphical element is displayed in step 1062. For the stroke, the second graphical element is an arrow connecting the third control point and the fourth control point. A third graphical element is then displayed in step 1064. For a stroke, the third graphical element is a series of parallel lines between the two arrows.

Figure 10E:
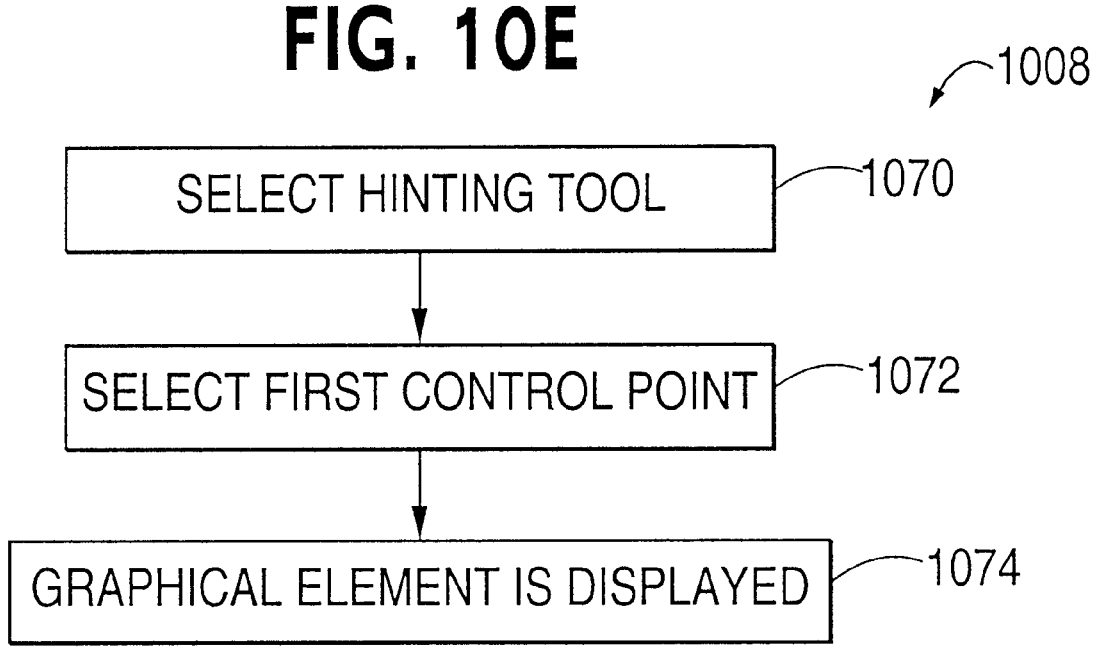

FIG. 10E corresponds to a hint involving a single control point, such as a move exception or a delta exception. As shown in FIG. 10E, the typographer selects a hinting tool in step 1070. For example, the typographer can select the delta exception hinting tool from the toolbar. If the typographer selects the delta exception tool, the cursor changes into a double headed arrow as discussed above in connection with the delta exception tool. The typographer selects the first control point in step 1072. A graphical element is displayed in step 1074. For the delta exception, the graphical element is a triangle located near the first control point.

In summary, the present invention is directed toward a method for creating hints for a font using a graphical user interface. Although the present invention has been described using specific hinting tools and specific graphical elements, those skilled in the art will appreciate that alternative hinting tools and graphical elements may be used. For example, to hint a non-TrueType font, the hinting tools would need to be modified to support the types of hinting permitted by the font.

Alternative graphical elements, such as color, may be used to differentiate hints. For example, a link and an interpolation may be represented by different colors rather than, or in addition to, different graphical elements. Although the display tools, viewing tools, control point tools and hinting tools have been described as being accessed from a toolbar, the tools may also be accessed using a combination of keystrokes or a menu. Although the present invention has been described in connection with an embodiment wherein a typographer selects a hinting tool and one or more control points, as will be apparent to those skilled in the art, the present invention may also be used in an embodiment that does not require the selection of a control point. For example, the typographer could hint a glyph by selecting any point on the glyph outline or an off curve control point, not just a control point located on the glyph outline. If the hints are to be compiled into a language that specifies hints using control points, such as the TrueType language, then the hinting program could resolve the selected point into a control point. One way for the hinting program to resolve the selected point into a control point would be to select the control point located closest to the selected point.

Additional alternative embodiments will become apparent to those skilled in the art to which the present invention pertains without departing from its spirit and scope. Accordingly, the scope of the present invention is described by the appended claims and is supported by the foregoing description.

What is claimed is:

1. A method for graphically authoring hints for a font using a graphical user interface comprising the steps of:

(a) loading the font;

(b) receiving control values for the font;

(c) displaying a glyph of the font having a plurality of control points with each control point based upon at least one control value;

(d) receiving a graphical hint by receiving a selection of a displayed graphical hinting tool corresponding to a hinting function and a selection of a first displayed control point for the glyph, wherein changes in a control value associated with the graphical hint can be automatically coded and compiled;

(e) applying the graphical hint to the glyph; and (f) displaying the hinted glyph.

2. The method of claim 1, wherein the step of receiving a graphical hint comprises:

receiving a selection of a second displayed control point; and displaying a graphical element representing the graphical hint connecting the first control point and the second control point on the displayed glyph.

3. The method of claim 2, further comprising the steps of:

receiving an option for the graphical hint;

displaying a graphical component representing the option with the graphical element; and applying the option to the glyph.

4. The method of claim 3, wherein the option associates a selected one of the control values with the graphical hint.

5. The method of claim 2, wherein the selected hinting tool is a link tool and the hinting function is a link.

6. The method of claim 1, wherein the step of receiving a graphical hint comprises:

receiving a selection of a second displayed control point;

displaying a first graphical element that connects the first control point and the second control point;

receiving a selection of a third displayed control point; and displaying a second graphical element representing the graphical hint connecting the first control point, the second control point, and the third control point.

7. The method of claim 6, wherein the selected hinting tool is an interpolate tool and the hinting function is an interpolation.

8. The method of claim 6, wherein the selected hinting tool is an align tool and the hinting function is an alignment.

9. The method of claim 1, wherein the step of receiving a graphical hint for the glyph comprises:

displaying a graphical element representing the graphical hint about the first control point.

10. The method of claim 9, wherein the selected hinting tool is a delta exception tool and the hinting function is a delta exception.

11. The method of claim 1, wherein the step of receiving a graphical hint for the glyph comprises:

receiving a selection of a second displayed control point;

displaying a first graphical element connecting the first control point and the second control point;

receiving selection of a third displayed control point and a selection of a fourth displayed control point;

displaying a second graphical element connecting the third control point and the fourth control point; and displaying a third graphical element representing the graphical hint, the third graphical element connecting the first graphical element and the second graphical element.

12. The method of claim 11, wherein the selected hinting tool is a stroke tool and the hinting function is a stroke.

13. The method of claim 1, further comprising the step of repeating steps (c)–(f) for a second glyph of the font.

14. The method of claim 1, further comprising the step of repeating steps (d)–(f) for a second graphical hint.

15. A computer-readable medium having computer executable instructions comprising the steps of:

(a) displaying a selected glyph having a plurality of control points with one or more control values associated with each control point;

(b) displaying a plurality of graphical hinting tools;

(c) receiving a selection of one of the displayed graphical hinting tools, the selected graphical hinting tool corresponding to a selected hinting function;

(d) receiving a selection of one of the displayed control points of the selected glyph;

(e) applying the selected hinting function to the selected control point, wherein changes in a corresponding value can be automatically coded and compiled; and (f) displaying the selected glyph with the selected hinting function applied.

16. The computer-readable medium of claim 15, further comprising the step of repeating steps (b)–(f) with a second selected hinting tool corresponding to a second selected hinting function and a second selected control point.

17. The computer-readable medium of claim 15, further comprising the step of receiving a selection of a second displayed selected control point.

18. The computer-readable medium of claim 17, wherein the step of applying the selected hinting function comprises:

positioning the second selected control point relative to the selected control point.

19. The computer-readable medium of claim 15, further comprising the step of:

displaying a graphical element corresponding to the selected hinting function on the selected glyph.

20. The computer-readable medium of claim 19, wherein the step of displaying the graphical element comprises displaying the graphical element using a color, the color indicating a flexibility associated with the selected hinting function.

21. The computer-readable medium of claim 15, wherein the hinting function is applied to a plurality of point sizes of the glyph.

22. The computer-readable medium of claim 15, wherein the hinting function is applied to a selected point size of the glyph.

23. The computer-readable medium of claim 15, wherein the step of displaying the selected glyph with the hinting function applied comprises displaying a bitmap for the selected glyph.

24. A method for graphically authoring hints for a TrueType font using a graphical user interface comprising the steps of:

receiving a selected glyph having a plurality of control points, wherein each control point has one or more associated control values;

displaying the selected glyph and the plurality of control points;

receiving a graphical hint by receiving a selection of a displayed graphical hinting tool and a selection of a first displayed control point, wherein changes in a corresponding control value can be automatically coded and compiled;

applying the graphical hint to the selected glyph; and displaying the selected glyph showing the application of the graphical hint.

25. The method of claim 24, wherein the step of receiving the graphical hint further comprises:

receiving a selection of a second displayed control point; and displaying a graphical element representing the graphical hint connecting the first control point and the second control point on the displayed glyph.

26. The method of claim 24, wherein the step of receiving the graphical hint further comprises:

receiving a selection of a second displayed control point and a selection of a third displayed control point; and displaying a graphical element representing the graphical hint connecting the first control point, the second control point, and the third control point.

27. The method of claim 24, wherein the step of receiving the graphical hint further comprises:

displaying a graphical element representing the hinting function about the first control point.

28. The method of claim 25, further comprising the step of receiving a modified graphical hint.

29. The method of claim 28, wherein the graphical element is an arrow having a tail and an arrowhead, the tail connected to the first selected control point and the arrowhead connected to the second selected control point, and wherein the step of receiving a modified graphical hint comprises:

receiving a selection of the tail of the arrow and a third selected control point; and displaying a modified graphical element representing the modified graphical hint connecting the third selected control point and the second selected control point.

30. The method of claim 28, wherein the graphical element is an arrow having a tail and an arrowhead, the tail connected to the first selected control point and the arrowhead connected to the second selected control point, and wherein the step of receiving a modified graphical hint comprises:

receiving a selection of the arrowhead of the arrow and a third selected control point; and displaying a modified graphical element representing the modified graphical hint connecting the first selected control point and the third selected control point.

31. The method of claim 24, wherein the step of receiving a graphical hint further comprises receiving a control value associated with the graphical hint.

32. A method for graphically authoring hints for a font using a graphical user interface comprising the steps of:
- displaying a glyph of the font, the glyph having a plurality of control points;
- receiving a hinting function by receiving a selection of a displayed graphical hinting function;
- receiving a selection of a first displayed control point of the glyph and a selection of a second displayed control point of the glyph;
- displaying a first graphical element connecting the first control point and the second control point on the displayed glyph, wherein changes in a control value associated with the graphical hinting function can be automatically coded and compiled;
- receiving a selection of a third displayed control point of the glyph;
- displaying a second graphical element representing the hinting function connecting the first control point, the second control point and the third control point on the displayed glyph; and
- displaying the glyph with the hinting function applied to the glyph.

33. The method of claim 32, wherein the hinting function is an interpolation, the first graphical element is a band, and the second graphical element is a pair of arrows, one arrow connecting the first control point and the third control point and another arrow connecting the second control point and the third control point.

34. The method of claim 32, wherein the hinting function is an alignment, the first graphical element is an arrow, and the second graphical element is a pair of arrows, one arrow connecting the first control point and the third control point and another arrow connecting the second control point and the third control point.

35. The method of claim 32, wherein the step of displaying the glyph with the hinting function applied comprises displaying a bitmap of the glyph.

36. A method for graphically authoring hints for a font using a graphical user interface comprising the steps of:
- displaying a glyph;
- displaying a plurality of graphical hinting tools;
- receiving a graphical hint by receiving a selection of one of the displayed graphical hinting tool;
- displaying a graphical element representing the graphical hint on the displayed glyph;
- receiving an option for the graphical hint, wherein changes in at least one control value associated with the graphical hint can be automatically coded and compiled;
- displaying a component of the graphical element representing the option;
- applying the graphical hint and the option to the glyph; and
- displaying the glyph showing the application of the graphical hint and the option.

37. The method of claim 36, wherein the graphical element comprises an arrow having an arrowhead, and wherein the step of receiving an option for the graphical hint comprises:
- detecting an input comprising a shift key in combination with the arrowhead; and
- receiving the option.

38. The method of claim 37, wherein the option is a stroke category option.

39. The method of claim 37, wherein the option is a minimum distance option.

40. The method of claim 36, further comprising the step of:
- modifying the option by:
  - detecting an input comprising a shift key in combination with the component; and
  - receiving a modified option.

41. The method of claim 40, wherein the option is a control value option.

42. The method of claim 36, wherein the graphical element comprises an arrow connecting a first control point and a second control point, the arrow having an arrowhead at the second control point, and wherein the step of receiving an option-for the graphical hint comprises:
- detecting an input comprising a shift key in combination with the second control point; and
- receiving the option.

43. The method of claim 41, wherein the option is a rounding option.

44. A method for graphically authoring hints for a font using a graphical user interface, comprising the steps of:
- (a) displaying a selected glyph by displaying a glyph outline for the selected glyph;
- (b) receiving a selection of a displayed graphical hinting tool corresponding to a selected hinting function;
- (c) receiving a selection of a first displayed point on the glyph outline and a selection of a second displayed point on the glyph outline;
- (d) applying the selected hinting function to the selected glyph, wherein changes in a control value for the hinting function can be automatically coded and compiled; and
- (e) displaying the selected glyph with the hinting function applied.

45. The method of claim 44, further comprising the step of repeating steps (b)–(e) with a second selected hinting tool corresponding to a second selected hinting function and a selected off curve control point.

46. The method of claim 44, wherein the first point is located on and identifies one side of a stem of the selected glyph and the second point is located on and identifies the opposite side of the stem of the selected glyph, and wherein the step of applying the selected hinting function comprises:
- positioning the side of the stem identified by the second point relative to the side of the stem identified by the first point.

47. The method of claim 44, further comprising the step of:
- displaying a graphical element corresponding to the selected hinting function on the selected glyph.

48. The method of claim 47, wherein the step of displaying the graphical element comprises displaying the graphical element using a color, the color indicating a flexibility associated with the selected hinting function.

49. A computer-readable medium having computer-executable instructions comprising the steps of:
- displaying a selected glyph having a plurality of control points;
- receiving a selection of a displayed graphical hinting tool corresponding to a selected hinting function and a hinting direction;

receiving a selection of one of the displayed control points;

displaying a graphical element corresponding to the selected hinting function and indicating the hinting direction on the selected glyph;

applying the selected hinting function to the selected control point, wherein changes in a selected control value associated with the selected hinting function can be automatically coded and compiled; and displaying the selected glyph with the selected hinting function applied.

50. The computer-readable medium of claim 49, wherein receiving a selection of a displayed graphical hinting tool includes receiving a selected control value, further comprising the step of:

associating the selected control value with the selected hinting function.

51. The computer-readable medium of claim 49, wherein the step of displaying the graphical element comprises displaying the graphical element using a color, the color indicating a flexibility associated with the selected hinting function.

52. The computer-readable medium of claim 49, wherein the step of displaying the selected glyph with the hinting function applied comprises displaying a bitmap for the selected glyph.

53. A method for graphically authoring hints for a font using a graphical user interface comprising the steps of:

receiving a selected glyph having a plurality of control points;

displaying the selected glyph;

receiving a graphical hint by receiving a selection of a displayed graphical hinting tool and a selection of a first displayed control point;

displaying a graphical element representing the hinting function about the first control point that indicates a hinting direction for the graphical hint;

applying the graphical hint to the selected glyph; and displaying the selected glyph showing the application of the graphical hint to the selected glyph.

54. The method of claim 53, wherein the step of receiving a graphical hint further comprises receiving a control value associated with the graphical hint.

55. The method of claim 53, wherein the step of displaying a graphical element comprises displaying the graphical element using a color, the color indicating a flexibility associated with the selected hinting function.

56. A method for graphically authoring hints for a font using a graphical user interface comprising the steps of:

displaying a glyph;

receiving a graphical hint by receiving a selection of a displayed graphical hinting tool;

displaying a graphical element representing the graphical hint on the glyph that indicates a flexibility associated with the graphical hint;

receiving an option for the graphical hint, wherein changes to a control value associated with the graphical hint can be automatically coded and compiled;

displaying a component of the graphical element representing the option;

applying the graphical hint and the option to the glyph; and displaying the glyph showing the application of the graphical hint and the option.

57. The method of claim 56, wherein the option is a control value option.

\* \* \* \* \*